US008230096B2

(12) United States Patent
Mazzaferri

(10) Patent No.: US 8,230,096 B2
(45) Date of Patent: Jul. 24, 2012

(54) METHODS AND SYSTEMS FOR GENERATING PLAYBACK INSTRUCTIONS FOR PLAYBACK OF A RECORDED COMPUTER SESSION

(75) Inventor: Richard James Mazzaferri, Mooney Mooney (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 1786 days.

(21) Appl. No.: 11/035,511

(22) Filed: Jan. 14, 2005

(65) Prior Publication Data
US 2006/0161555 A1 Jul. 20, 2006

(51) Int. Cl.
*G06F 15/16* (2006.01)
(52) U.S. Cl. ........ 709/231; 709/201; 709/203; 709/217; 709/218; 709/219
(58) Field of Classification Search ................ None
See application file for complete search history.

(56) References Cited

U.S. PATENT DOCUMENTS

| 4,138,719 A | 2/1979 | Swanstrom et al. |
| 4,807,029 A | 2/1989 | Tanaka |
| 4,928,247 A | 5/1990 | Doyle et al. |
| 4,937,036 A | 6/1990 | Beard et al. |
| 4,949,248 A | 8/1990 | Caro |
| 4,965,819 A | 10/1990 | Kannes |
| 4,974,173 A | 11/1990 | Stefik et al. |
| 5,021,949 A | 6/1991 | Morten et al. |
| 5,062,060 A | 10/1991 | Kolnick |
| 5,072,412 A | 12/1991 | Henderson et al. |
| 5,083,860 A | 1/1992 | Miyatake et al. |
| 5,103,305 A | 4/1992 | Watanabe |
| 5,114,504 A | 5/1992 | AbuJudom, II et al. |
| 5,121,497 A | 6/1992 | Kerr et al. |
| 5,241,625 A | 8/1993 | Epard et al. |
| 5,243,596 A | 9/1993 | Port et al. |
| 5,307,456 A | 4/1994 | MacKay |
| 5,313,581 A | 5/1994 | Giokas et al. |
| 5,317,732 A | 5/1994 | Gerlach, Jr. et al. |
| 5,359,712 A | 10/1994 | Cohen et al. |
| 5,382,972 A | 1/1995 | Kannes |
| 5,388,197 A | 2/1995 | Rayner |
| 5,392,223 A | 2/1995 | Caci |
| 5,392,400 A | 2/1995 | Berkowitz et al. |

(Continued)

FOREIGN PATENT DOCUMENTS
EP 0 475 581 A2 3/1992
(Continued)

OTHER PUBLICATIONS

Communication pursuant to Article 94(3) EP Application No. 07119879.0-1525; Dated Jun. 20, 2008; 8 pages.

(Continued)

*Primary Examiner* — Thu Nguyen
*Assistant Examiner* — Angela Widhalm
(74) *Attorney, Agent, or Firm* — Foley and Lardner LLP; John D. Lanza

(57) ABSTRACT

A protocol engine executing on a first device receives a recorded stream comprising a plurality of packets representing display data generated by an application program executed on a second device. The protocol engine determines for a packet in the recorded stream, to render the contents of the packet in a human-perceptible manner. The protocol engine stores the determination in a playback data structure.

17 Claims, 18 Drawing Sheets

U.S. PATENT DOCUMENTS

| | | | |
|---|---|---|---|
| 5,404,316 A | 4/1995 | Klingler et al. |
| 5,408,655 A | 4/1995 | Oren et al. |
| 5,432,932 A | 7/1995 | Chen et al. |
| 5,437,025 A | 7/1995 | Bale et al. |
| 5,461,711 A | 10/1995 | Wang et al. |
| 5,550,965 A | 8/1996 | Gabbe et al. |
| 5,572,258 A | 11/1996 | Yokoyama |
| 5,572,643 A | 11/1996 | Judson |
| 5,574,845 A | 11/1996 | Benson et al. |
| 5,577,188 A | 11/1996 | Zhu |
| 5,577,254 A | 11/1996 | Gilbert |
| 5,619,638 A | 4/1997 | Duggan et al. |
| 5,623,603 A | 4/1997 | Jiang et al. |
| 5,636,371 A | 6/1997 | Yu |
| 5,717,879 A | 2/1998 | Moran et al. |
| 5,721,827 A | 2/1998 | Logan et al. |
| 5,727,950 A | 3/1998 | Cook et al. |
| 5,729,689 A | 3/1998 | Allard et al. |
| 5,732,216 A | 3/1998 | Logan et al. |
| 5,745,759 A | 4/1998 | Hayden et al. |
| 5,748,499 A | 5/1998 | Trueblood |
| 5,751,362 A | 5/1998 | Lee |
| 5,758,110 A | 5/1998 | Boss et al. |
| 5,761,656 A | 6/1998 | Ben-Shachar |
| 5,768,614 A | 6/1998 | Takagi et al. |
| 5,796,566 A | 8/1998 | Sharma et al. |
| 5,802,206 A | 9/1998 | Marold |
| 5,822,436 A | 10/1998 | Rhoads |
| 5,832,119 A | 11/1998 | Rhoads |
| 5,835,090 A | 11/1998 | Clark et al. |
| 5,838,300 A | 11/1998 | Takagi et al. |
| 5,838,906 A | 11/1998 | Doyle et al. |
| 5,841,978 A | 11/1998 | Rhoads |
| 5,862,260 A | 1/1999 | Rhoads |
| 5,886,707 A | 3/1999 | Berg |
| 5,907,704 A | 5/1999 | Gudmundson et al. |
| 5,909,559 A | 6/1999 | So |
| 5,935,212 A | 8/1999 | Kalajan et al. |
| 5,968,132 A | 10/1999 | Tokunaga et al. |
| 5,990,852 A | 11/1999 | Szamrej |
| 6,003,030 A | 12/1999 | Kenner et al. |
| 6,006,242 A | 12/1999 | Poole et al. |
| 6,011,537 A | 1/2000 | Slotznick |
| 6,022,315 A | 2/2000 | Iliff |
| 6,052,120 A | 4/2000 | Nahi et al. |
| 6,111,954 A | 8/2000 | Rhoads |
| 6,122,403 A | 9/2000 | Rhoads |
| 6,141,699 A | 10/2000 | Luzzi et al. |
| 6,166,729 A | 12/2000 | Acosta et al. |
| 6,167,432 A | 12/2000 | Jiang |
| 6,173,316 B1 | 1/2001 | De Boor et al. |
| 6,181,736 B1 | 1/2001 | McLaughlin et al. |
| 6,185,625 B1 | 2/2001 | Tso et al. |
| 6,199,076 B1 | 3/2001 | Logan et al. |
| 6,199,753 B1 | 3/2001 | Tracy et al. |
| 6,201,948 B1 | 3/2001 | Cook et al. |
| 6,206,829 B1 | 3/2001 | Iliff |
| 6,233,617 B1 | 5/2001 | Rothwein et al. |
| 6,237,138 B1 * | 5/2001 | Hameluck et al. | 717/128 |
| 6,243,375 B1 | 6/2001 | Speicher |
| 6,263,363 B1 | 7/2001 | Rosenblatt et al. |
| 6,278,466 B1 | 8/2001 | Chen |
| 6,286,030 B1 | 9/2001 | Wenig et al. |
| 6,286,036 B1 | 9/2001 | Rhoads |
| 6,289,382 B1 | 9/2001 | Bowman-Amuah |
| 6,289,461 B1 | 9/2001 | Dixon |
| 6,295,340 B1 | 9/2001 | Cannon et al. |
| 6,307,550 B1 | 10/2001 | Chen et al. |
| 6,317,781 B1 | 11/2001 | De Boor et al. |
| 6,321,252 B1 | 11/2001 | Bhola et al. |
| 6,324,573 B1 | 11/2001 | Rhoads |
| 6,331,855 B1 | 12/2001 | Schauser |
| 6,332,163 B1 | 12/2001 | Bowman-Amuah |
| 6,338,088 B1 | 1/2002 | Waters et al. |
| 6,339,832 B1 | 1/2002 | Bowman-Amuah |
| 6,345,239 B1 | 2/2002 | Bowman-Amuah |
| 6,351,777 B1 | 2/2002 | Simonoff |
| 6,356,437 B1 | 3/2002 | Mitchell et al. |
| 6,366,933 B1 | 4/2002 | Ball et al. |
| 6,381,341 B1 | 4/2002 | Rhoads |
| 6,400,996 B1 | 6/2002 | Hoffberg et al. |
| 6,401,118 B1 | 6/2002 | Thomas |
| 6,405,252 B1 | 6/2002 | Gupta et al. |
| 6,408,331 B1 | 6/2002 | Rhoads |
| 6,409,602 B1 * | 6/2002 | Wiltshire et al. | 463/42 |
| 6,421,726 B1 | 7/2002 | Kenner et al. |
| 6,427,063 B1 | 7/2002 | Cook et al. |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,437,818 B1 | 8/2002 | Ludwig et al. |
| 6,438,231 B1 | 8/2002 | Rhoads |
| 6,438,594 B1 | 8/2002 | Bowman-Amuah |
| 6,442,748 B1 | 8/2002 | Bowman-Amuah |
| 6,466,654 B1 | 10/2002 | Cooper et al. |
| 6,470,381 B2 | 10/2002 | De Boor et al. |
| 6,473,745 B2 | 10/2002 | Doerr et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,482,156 B2 | 11/2002 | Iliff |
| 6,496,850 B1 | 12/2002 | Bowman-Amuah |
| 6,498,955 B1 | 12/2002 | McCarthy et al. |
| 6,502,102 B1 | 12/2002 | Haswell et al. |
| 6,502,125 B1 | 12/2002 | Kenner et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,526,335 B1 | 2/2003 | Treyz et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,336 B1 | 3/2003 | Vock et al. |
| 6,539,396 B1 | 3/2003 | Bowman-Amuah |
| 6,539,429 B2 | 3/2003 | Rakavy et al. |
| 6,549,949 B1 | 4/2003 | Bowman-Amuah |
| 6,550,057 B1 | 4/2003 | Bowman-Amuah |
| 6,553,129 B1 | 4/2003 | Rhoads |
| 6,567,533 B1 | 5/2003 | Rhoads |
| 6,567,813 B1 | 5/2003 | Zhu et al. |
| 6,571,282 B1 | 5/2003 | Bowman-Amuah |
| 6,573,907 B1 | 6/2003 | Madrane et al. |
| 6,574,672 B1 | 6/2003 | Mitchell et al. |
| 6,578,068 B1 | 6/2003 | Bowman-Amuah |
| 6,580,808 B2 | 6/2003 | Rhoads |
| 6,584,493 B1 | 6/2003 | Butler |
| 6,584,569 B2 | 6/2003 | Reshef et al. |
| 6,590,998 B2 | 7/2003 | Rhoads |
| 6,597,736 B1 | 7/2003 | Fadel |
| 6,601,087 B1 | 7/2003 | Zhu et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,479 B2 | 8/2003 | Cook et al. |
| 6,606,660 B1 | 8/2003 | Bowman-Amuah |
| 6,606,744 B1 | 8/2003 | Mikurak |
| 6,609,128 B1 | 8/2003 | Underwood |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,647,128 B1 | 11/2003 | Rhoads |
| 6,647,130 B2 | 11/2003 | Rhoads |
| 6,654,032 B1 | 11/2003 | Zhu et al. |
| 6,658,464 B2 | 12/2003 | Reisman |
| 6,665,706 B2 | 12/2003 | Kenner et al. |
| 6,671,818 B1 | 12/2003 | Mikurak |
| 6,671,876 B1 * | 12/2003 | Podowski | 717/130 |
| 6,675,204 B2 | 1/2004 | De Boor et al. |
| 6,681,029 B1 | 1/2004 | Rhoads |

| | | |
|---|---|---|
| 6,687,745 B1 | 2/2004 | Franco et al. |
| 6,691,154 B1 | 2/2004 | Zhu et al. |
| 6,697,894 B1 | 2/2004 | Mitchell et al. |
| 6,700,990 B1 | 3/2004 | Rhoads |
| 6,701,514 B1 | 3/2004 | Haswell et al. |
| 6,704,873 B1 | 3/2004 | Underwood |
| 6,711,474 B1 | 3/2004 | Treyz et al. |
| 6,715,145 B1 | 3/2004 | Bowman-Amuah |
| 6,718,535 B1 | 4/2004 | Underwood |
| 6,721,703 B2 | 4/2004 | Jackson et al. |
| 6,721,713 B1 | 4/2004 | Guheen et al. |
| 6,742,015 B1 | 5/2004 | Bowman-Amuah |
| 6,751,320 B2 | 6/2004 | Rhoads |
| 6,760,463 B2 | 7/2004 | Rhoads |
| 6,763,501 B1 | 7/2004 | Zhu et al. |
| 6,774,926 B1 | 8/2004 | Ellis et al. |
| 6,775,392 B1 | 8/2004 | Rhoads |
| 6,782,411 B2 * | 8/2004 | Navare et al. ............... 709/203 |
| 6,799,221 B1 | 9/2004 | Kenner et al. |
| RE38,609 E | 10/2004 | Chen et al. |
| 6,801,927 B1 | 10/2004 | Smith et al. |
| 6,802,041 B1 | 10/2004 | Rehm |
| 6,810,488 B2 | 10/2004 | Teng |
| 6,813,366 B1 | 11/2004 | Rhoads |
| 6,824,044 B1 | 11/2004 | Lapstun et al. |
| 6,842,509 B2 | 1/2005 | Olafsson |
| 6,842,906 B1 | 1/2005 | Bowman-Amuah |
| 6,849,045 B2 | 2/2005 | Iliff |
| 6,850,252 B1 | 2/2005 | Hoffberg |
| 6,870,921 B1 | 3/2005 | Elsey et al. |
| 6,877,043 B2 | 4/2005 | Mallory et al. |
| 6,879,701 B1 | 4/2005 | Rhoads |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,546 B1 | 6/2005 | Haswell et al. |
| 6,934,376 B1 | 8/2005 | McLaughlin et al. |
| 6,944,279 B2 | 9/2005 | Elsey et al. |
| 6,954,800 B2 | 10/2005 | Mallory |
| 6,957,186 B1 | 10/2005 | Guheen et al. |
| 6,968,057 B2 | 11/2005 | Rhoads |
| 6,968,364 B1 | 11/2005 | Wong et al. |
| 6,975,655 B2 | 12/2005 | Fischer et al. |
| 6,986,459 B2 | 1/2006 | Paul et al. |
| 6,988,126 B2 | 1/2006 | Wilcock et al. |
| 6,988,236 B2 | 1/2006 | Ptasinski et al. |
| 6,993,101 B2 | 1/2006 | Trachewsky et al. |
| 6,996,605 B2 | 2/2006 | Low et al. |
| 7,000,019 B2 | 2/2006 | Low et al. |
| 7,000,031 B2 | 2/2006 | Fischer et al. |
| 7,000,180 B2 | 2/2006 | Balthaser |
| 7,006,881 B1 | 2/2006 | Hoffberg et al. |
| 7,013,323 B1 | 3/2006 | Thomas et al. |
| 7,023,979 B1 | 4/2006 | Wu et al. |
| 7,024,456 B1 | 4/2006 | Simonoff |
| 7,032,030 B1 | 4/2006 | Codignotto |
| 7,035,285 B2 | 4/2006 | Holloway et al. |
| 7,035,427 B2 | 4/2006 | Rhoads |
| 7,035,907 B1 | 4/2006 | Decasper et al. |
| 7,043,529 B1 | 5/2006 | Simonoff |
| 7,043,669 B2 * | 5/2006 | Brown ........................ 714/45 |
| 7,047,092 B2 | 5/2006 | Wimsatt |
| 7,054,465 B2 | 5/2006 | Rhoads |
| 7,058,697 B2 | 6/2006 | Rhoads |
| 7,069,234 B1 | 6/2006 | Cornelius et al. |
| 7,069,332 B2 | 6/2006 | Shibata et al. |
| 7,073,126 B1 | 7/2006 | Khandekar |
| 7,073,189 B2 | 7/2006 | McElhatten et al. |
| 7,082,572 B2 | 7/2006 | Pea et al. |
| 7,089,487 B2 | 8/2006 | Tsai |
| 7,092,370 B2 | 8/2006 | Jiang et al. |
| 7,100,195 B2 | 8/2006 | Underwood |
| 7,103,197 B2 | 9/2006 | Rhoads |
| 7,113,596 B2 | 9/2006 | Rhoads |
| 7,113,614 B2 | 9/2006 | Rhoads |
| 7,116,781 B2 | 10/2006 | Rhoads |
| 7,123,656 B1 * | 10/2006 | Reznik ................... 375/240.18 |
| 7,124,101 B1 | 10/2006 | Mikurak |
| 7,124,175 B1 | 10/2006 | Wolfe et al. |
| 7,130,403 B2 | 10/2006 | Caspi et al. |
| 7,130,807 B1 | 10/2006 | Mikurak |
| 7,133,085 B2 * | 11/2006 | Morita et al. ................ 348/836 |
| 7,133,837 B1 | 11/2006 | Barnes, Jr. |
| 7,139,999 B2 | 11/2006 | Bowman-Amuah |
| 7,149,698 B2 | 12/2006 | Guheen et al. |
| 7,149,788 B2 | 12/2006 | Gundla et al. |
| 7,165,041 B1 | 1/2007 | Guheen et al. |
| 7,167,844 B1 | 1/2007 | Leong et al. |
| 7,171,016 B1 | 1/2007 | Rhoads |
| 7,171,174 B2 | 1/2007 | Ellis et al. |
| 7,174,126 B2 | 2/2007 | McElhatten et al. |
| 7,184,531 B2 | 2/2007 | Crouch |
| 7,185,283 B1 * | 2/2007 | Takahashi .................... 715/723 |
| 7,213,211 B1 | 5/2007 | Sanders et |
| 7,225,130 B2 | 5/2007 | Roth et al. |
| 7,228,340 B2 | 6/2007 | De Boor et al. |
| 7,313,613 B1 | 12/2007 | Brooking et al. |
| 7,398,320 B1 * | 7/2008 | Minakuchi et al. .......... 709/231 |
| 7,401,116 B1 | 7/2008 | Chalfin et al. |
| 7,490,166 B2 * | 2/2009 | Yang et al. .................. 709/246 |
| 7,558,806 B2 | 7/2009 | Bobrovskiy et al. |
| 7,590,750 B2 * | 9/2009 | Adbo et al. .................. 709/231 |
| 7,627,658 B2 * | 12/2009 | Levett et al. ................. 709/223 |
| 7,669,206 B2 * | 2/2010 | Sherwani ..................... 719/318 |
| 2001/0019630 A1 | 9/2001 | Johnson |
| 2001/0056547 A1 | 12/2001 | Dixon |
| 2002/0032770 A1 | 3/2002 | Fertell et al. |
| 2002/0033844 A1 | 3/2002 | Levy et al. |
| 2002/0035451 A1 | 3/2002 | Rothermel |
| 2002/0038388 A1 | 3/2002 | Netter |
| 2002/0052932 A1 | 5/2002 | Curtis et al. |
| 2002/0057295 A1 * | 5/2002 | Panasyuk et al. ............. 345/804 |
| 2002/0126144 A1 | 9/2002 | Chenede |
| 2002/0165922 A1 | 11/2002 | Wei |
| 2002/0174181 A1 | 11/2002 | Wei |
| 2002/0194272 A1 | 12/2002 | Zhu |
| 2003/0018662 A1 | 1/2003 | Li |
| 2003/0055896 A1 | 3/2003 | Hu et al. |
| 2003/0061355 A1 | 3/2003 | Yang et al. |
| 2003/0084169 A1 | 5/2003 | Zhu et al. |
| 2003/0085922 A1 | 5/2003 | Wei |
| 2003/0135656 A1 | 7/2003 | Schneider et al. |
| 2003/0164853 A1 | 9/2003 | Zhu et al. |
| 2003/0167293 A1 | 9/2003 | Zhu et al. |
| 2003/0167301 A1 | 9/2003 | Zhu et al. |
| 2003/0167302 A1 | 9/2003 | Zhu et al. |
| 2003/0167303 A1 | 9/2003 | Zhu et al. |
| 2003/0167304 A1 | 9/2003 | Zhu et al. |
| 2003/0167305 A1 | 9/2003 | Zhu et al. |
| 2003/0167339 A1 | 9/2003 | Zhu et al. |
| 2003/0167418 A1 | 9/2003 | Zhu et al. |
| 2003/0177172 A1 | 9/2003 | Duursma et al. |
| 2003/0182375 A1 | 9/2003 | Zhu et al. |
| 2003/0191799 A1 | 10/2003 | Araujo et al. |
| 2003/0208529 A1 | 11/2003 | Pendyala et al. |
| 2003/0220973 A1 | 11/2003 | Zhu et al. |
| 2003/0226038 A1 | 12/2003 | Raanan et al. |
| 2004/0002048 A1 | 1/2004 | Thurmaier et al. |
| 2004/0017394 A1 | 1/2004 | Adachi |
| 2004/0031058 A1 | 2/2004 | Reisman |
| 2004/0044521 A1 | 3/2004 | Chen et al. |
| 2004/0103438 A1 | 5/2004 | Yan et al. |
| 2004/0135974 A1 * | 7/2004 | Favalora et al. ................ 353/10 |
| 2004/0143602 A1 * | 7/2004 | Ruiz et al. ................... 707/104.1 |
| 2004/0205213 A1 | 10/2004 | Paz et al. |
| 2004/0207723 A1 | 10/2004 | Davis et al. |
| 2004/0240387 A1 | 12/2004 | Nuzman et al. |
| 2004/0267820 A1 | 12/2004 | Boss et al. |
| 2004/0267952 A1 | 12/2004 | He et al. |
| 2005/0019014 A1 | 1/2005 | Yoo et al. |
| 2005/0080850 A1 | 4/2005 | Salesky et al. |
| 2005/0123058 A1 * | 6/2005 | Greenbaum et al. ...... 375/240.28 |
| 2005/0132417 A1 | 6/2005 | Bobrovskiy et al. |
| 2005/0254775 A1 * | 11/2005 | Hamilton et al. ................ 386/46 |
| 2006/0064716 A1 | 3/2006 | Sull et al. |
| 2006/0130124 A1 | 6/2006 | Richardson et al. |
| 2006/0136475 A1 | 6/2006 | Karmakar et al. |
| 2006/0161671 A1 | 7/2006 | Ryman et al. |

| | | | |
|---|---|---|---|
| 2006/0161959 A1 | 7/2006 | Ryman et al. | |
| 2006/0274828 A1 | 12/2006 | Siemens et al. | |
| 2007/0005795 A1 | 1/2007 | Gonzalez | |
| 2007/0022155 A1 | 1/2007 | Owens et al. | |
| 2007/0106681 A1 | 5/2007 | Haot et al. | |
| 2008/0068289 A1 | 3/2008 | Piasecki | |
| 2009/0282444 A1 | 11/2009 | Laksono et al. | |

FOREIGN PATENT DOCUMENTS

| | | |
|---|---|---|
| EP | 495612 A2 | 7/1992 |
| EP | 0 645 695 | 3/1995 |
| EP | 1 469 382 | 10/2004 |
| GB | 2 327 836 | 2/1999 |
| WO | WO-2006/076389 A2 | 7/2006 |
| WO | WO-2006/076389 A2 | 7/2006 |

OTHER PUBLICATIONS

Communication pursuant to Article 94(3) EPC EP Application No. 07120005.9-1525; Dated Jun. 20, 2008; 9 pages.
Communication Pursuant to Article 94(3) EPC for EP Application No. 0711991.3-1525; Dated Jun. 20, 2008; 12 pages.
Communication pursuant to Article 96(2) EPC dated Oct. 24, 2007; EP Application No. 06718013.3-1525; 6 pages.
Communication pursuant to Article 96(2) EPC EP Application No. 06718012.5-1525; Dated Oct. 24, 2007; 5 pages.
Cruz, G. and Hill, R., "Capturing and Playing Multimedia Events with Streams", in Proceedings of ACM Multimedia '94, San Francisco, CA, Oct. 15-20, 1994, pp. 193-200.
European Search Report EP Application No. 07119879 completed Jan. 16, 2008; 5 pages.
Extended European Search Report EP 0712005; Dated Dec. 14, 2007; 6 pages.
Extended European Search Report from EP Application No. 07119991.3-1525 completed Mar. 4, 2008; 9 pages.
International Search Report, PCT/US2007/081751, Oct. 29, 2008.
Krishnakumar A. S. et al., "VLSI Implementations of Communication Protocols—A Survey" IEEE Journal on Selected Areas in Communications, IEEE Service Center, Piscataway, NJ, vol. 7, No. 7, Sep. 1, 1989, pp. 1082-1090.
Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.
Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.
Partial European Search Report completed on Dec. 14, 2007; EP Application No. EP07119991; 3 pages.
Pedersen, E.R., McCall, K., Moran, T.P., and Halasz, F.G., "Tivoli: An Electronic Whiteboard for Informal Workgroup Meetings," INTERCHI '93,Apr. 24-29, 1993, pp. 391-398.
Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.
Smith, Advanced Linux Networking, Jun. 11, 2002, Addison Wesley Professional, Chapter 14-Section 4.
Wolf, C.G., Rhyne, J.R., and Briggs, L.K., "Communication and Information Retrieval with a Pen-based Meeting Support Tool," CSCW 92 Proceedings, Nov. 1992, pp. 322-329.
Crusty, "The Unofficial XviD FAQ", Web Page, Mar. 4, 2004, pp. 1-50, XP002338686, p. 8: paragraph 2-5, p. 31: paragraph 5-6.
De Alwis, "Screen Capturing and Playback Using VNC", Web Page, (Online), Oct. 31, 2004, pp. 1-2, XP002389238, available at: http://www.cs.ubc.ca/{bsd/vncrecording.html.
Reilly, "Today's Linux screen capture technology", NEWSFORGE, (Online), Aug. 17, 2004, pp. 1-3, XP002389239, available at: http://software.newsforge.com/article.
Sandklef, H, "Testing Applications with XNEE", Linux Journal (Online), 2004, pp. 1-6, vol. 2004, No. 117, ISSN:1075-3583, ACM Digital Library, available at: http://portal.acm.org/citation.cfm?id=959336.959341&coll=GUIDE&dl=ACM&idx=J508&part=periodical&WantType=periodical&title=Linux%20Journal.
Sandklef, H, "XNEE Manual", Manual Version 1.08D, Oct. 2003, available at: http://web.archive.org/web/20040627125613/www.gnu.org/software/xnee/www/manual/xnee.pdf.
Stanonik, R, "Recording/Playing Both Gaze Date and Computer Interaction," Nov. 30, 2000, available at: http://hci.ucsd.edu/eye/gaze.txt.
Stanonik, R, "Reversing the VNC Record File," Mar. 18, 2002, pp. 1-3, available at: http://www.archive.org/web/20060703115503/http://hci.ucsd.edu/eye/reversing.txt.
Zeldovich, et al., "Interactive performance measurement with VNCplay", USENIX 2005 Annual Technical Conference, (Online), Apr. 10, 2005, pp. 189-198, XP002381191, Anaheim, CA, US, ISBN: 1-931971-28-5, available at: http://www.usenix.org/events/usenix05/tech/freenix/full_papers/zeldovich/zeldovich.pdf.
International Search Report to PCT/US2006/000887 (Jul. 24, 2006) 8 pages.
Written Opinion of the International Searching Authority to PCT/US2006/000887 (Jul. 24, 2006) 19 pages.
International Search Report to PCT/US2006/000888, (Aug. 31, 2006), 9 pages.
Written Opinion of the International Searching Authority to PCT/US2006/000888, (Aug. 31, 2006), 14 pages.
Non Final Office Action dated Apr. 14, 2009, pertaining to U.S. Appl. No. 11/035,851, 11 pages.
Final Office Action dated Sep. 15, 2009, pertaining to U.S. Appl. No. 11/035,851, 13 pages.
Final Office Action dated Jan. 6, 2009, pertaining to U.S. Appl. No. 11/036,486, 46 pages.
Non Final Office Action dated Apr. 29, 2008, pertaining to U.S. Appl. No. 11/036,486, 20 pages.
Non Final Office Action dated Aug. 3, 2009, pertaining to U.S. Appl. No. 11/036,486, 39 pages.
Non Final Office Action dated May 26, 2009, pertaining to U.S. Appl. No. 11/036,840, 11 pages.
Final Office Action dated Jul. 7, 2009, pertaining to U.S. Appl. No. 11/036,489, 16 pages.
Non Final Office Action dated Sep. 4, 2009, pertaining to U.S. Appl. No. 11/036,489, 21 pages.
Non Final Office Action dated Dec. 10, 2008, pertaining to U.S. Appl. No. 11/036,489, 17 pages.
Non Final Office Action dated Jun. 3, 2009, pertaining to U.S. Appl. No. 11/555,611, 16 pages.
Non Final Office Action dated Mar. 30, 2009, pertaining to U.S. Appl. No. 11/555,615, 25 pages.
Adrian Nye, XLIB Programming Manual, Rel. 5, Third Edition, Jun. 30, 1994, O'Reilly Media, Inc., chapter 2.
European Exam Report for 06718012.5 dated May 27, 2011.
Office Action for U.S. Appl. No. 11/036,489 dated Jun. 7, 2011.
Office Action for U.S. Appl. No. 11/555,611 dated Sep. 30, 2010.
Office Action for U.S. Appl. No. 11/035,851 dated Aug. 19, 2010.
"Remote Desktop Environments Reflected in Local Windows" IBM Technical Disclosure Bulletin, Mar. 1993, vol. 36, Issue 3, pp. 421-426.
Chinese Office Action on 200780047081.9 dated Nov. 23, 2011.
Christiansen, B.O., Schauser, K.E., Munke, M.; "A Novel Codec for Thin Client Computing,"In Proceedings of the IEEE Data Compression Conference, Snowbird, UT, Mar. 28-30, 2000, pp. 1-10.
Christiansen, B.O., Schauser, K.E., Munke, M.; "Streaming Thin Client Compression," In Proceedings of the IEEE Data Compression Conference, Snowbird, UT, Mar. 27-29, 2001, pp. 1-10.
Dennis Baker, Using Xinerama to Multihead XFree86 V.4.0 [Online], Nov. 15, 2002, XP002417796. Available at: http://www.tldp.org/HOWTO/Xinerama-HOWTO/.
Final Office Action dated Jan. 8, 2009. 12 pages.
Final Office Action dated Mar. 19, 2010. 9 pages.
International Search Report for corresponding International Application No. PCT/US2007/021098, mailed Feb. 22, 2008,4 pages.
International Search Report for PCT/US2006/038629. Mailing Date Feb. 23, 2007. 3 pages.
Non-Final Office Action dated Nov. 25, 2011. 9 pages.

Non-Final Office Action for U.S. Appl. No. 11/243,512 mailed Jul. 9, 2008.
Notice of Allowance on U.S. Appl. No. 11/035,851 dated Dec. 12, 2011.
Notice of Allowance on U.S. Appl. No. 11/243,512 dated Feb. 17, 2012.
Office Action on U.S. Appl. No. 11/036,489 dated Jan. 20, 2011.
Office Action on U.S. Appl. No. 11/036,489 dated Oct. 14, 2011.
Office Action on U.S. Appl. No. 11/243,512 dated May 10, 2011.
Office Action on U.S. Appl. No. 12/609,731 dated Nov. 30, 2011.
Written Opinion of the International Searching Authority for PCT/US2006/038629 dated Jan. 31, 2007.
X Desktop Group: "Extended window manager hints" [Online], May 13, 2003, Available at: http://standards.freedesktop.org/wm-spec/wm-spec-latest.html.

* cited by examiner

METHODS AND SYSTEMS FOR GENERATING PLAYBACK INSTRUCTIONS FOR PLAYBACK OF A RECORDED COMPUTER SESSION

FIELD OF THE INVENTION

The present invention relates to methods and systems for generating playback instructions and, in particular, generating playback instructions for playback of a recorded computer session.

BACKGROUND OF THE INVENTION

Remote presentation protocols such as the ICA protocol manufactured by Citrix Systems, Inc., of Ft. Lauderdale, Fla., the X protocol by the X.org Foundation, the Virtual Network Computing protocol of AT&T Corp., or the RDP protocol, manufactured by Microsoft Corporation of Redmond, Wash., are inherently stateful. In order to view a particular point in a stream of recorded presentation protocol data, playback of the stream must begin from the very beginning of stream and played back sequentially until the particular point is encountered.

Many conventional methods for session recording operate by taking screen snapshots periodically, and some of these increase the snapshot frequency in response to indications of potential interest gleaned from session activity. The sequences of images may be viewed as slide shows or using image collection management tools. Other methods may record to frame-based digital video formats such as MPG or AVI, and these are viewed with an appropriate media player such as Windows Media Player or the QuickTime player. Many conventional methods lack the ability to reduce review time by eliminating sections showing interactions with certain windows or applications.

Some conventional methods enable playback of recorded sessions at multiples of real-time rate. A user can choose to play back at any one of those multiples, and may change the speed multiplier during playback. However, because the user is unaware of what is about to be rendered, they are prone to turning the speed up during sections of low interest and then missing details when sections of higher interest start. Furthermore, even speeds many times faster than real time are subjectively slow when reviewing lengthy sections of insignificant user activity.

Many conventional systems attempt to optimize playback by minimizing snapshot generation to increase the speed of stream traversal. In some instances, some of these systems perform less frequent screen snapshots until significant activity is detected, and then increasing the frequency of snapshots. Some of these systems may suffer the drawback of losing state when inputs and state changes between snapshots are not captured.

SUMMARY OF THE INVENTION

The present invention provides a method for recording and playback of remote presentation protocols such as the ICA protocol manufactured by Citrix Systems, Inc., of Ft. Lauderdale, Fla., the X protocol by the X.org Foundation, the Virtual Network Computing protocol of AT&T Corp., or the RDP protocol, manufactured by Microsoft Corporation of Redmond, Wash. The present invention reduces the time spent manually reviewing session recordings by removing from playback one or more sections of the recording where it can be algorithmically determined that nothing of significance occurs. The present invention provides a directed playback, i.e. an alternative rendering of the recorded session. The invention enhances the off-screen rendering operation to generate a playback data structure that describes how to perform the directed playback, and uses that playback data structure to control the on-screen rendering process.

In one aspect, the present invention relates to a method for generating playback instructions for playback of a recorded computer session. A protocol engine executing on a first device receives a recorded stream comprising a plurality of packets representing display data generated by an application program executed on a second device. The protocol engine determines for a packet in the recorded stream, to render the contents of the packet in a human-perceptible manner. The protocol engine stores the determination in a playback data structure.

In another aspect, the present invention relates to a method for playback of a recorded computer session. A background protocol engine executing on a first device receives a recorded stream comprising a plurality of packets representing display data generated by an application program executing on a second device. The background protocol engine determines to render the packet in a human-perceptible manner. The background protocol engine stores the determination in a playback data structure. A foreground protocol engine retrieves at least one packet from the recorded stream. The foreground protocol engine accesses the playback data structure. The foreground protocol engine renders the at least one packet responsive to the playback data structure.

In still another aspect, the present invention relates to a system for rendering a recorded session. A background protocol engine executing on a first device generates a playback data structure in response to receiving a recorded stream, said recorded stream representing display data generated by an application program executed on a second device. A foreground protocol engine, receiving the recorded stream, renders the recorded stream responsive to the playback data structure generated by the background protocol engine.

BRIEF DESCRIPTION OF THE DRAWINGS

These and other aspects of the invention will be readily apparent from the detailed description below and the appended drawings, which are meant to illustrate and not to limit the invention, and in which.

DETAILED DESCRIPTION OF THE INVENTION

Figure 1A:
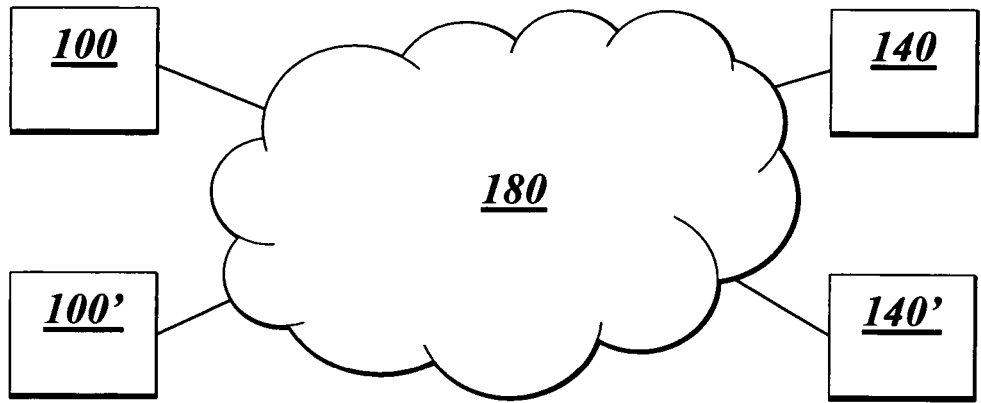
FIG. 1A is a block diagram depicting a client-server system suitable for practicing one embodiment of the present invention.

Referring now to FIG. 1A, in brief overview, one embodiment of a client-server system in which the present invention may be used is depicted. A first computing device 100' (generally 100) communicates with a second computing device 140' (generally 140) over a communications network 180. The topology of the network 180 over which the first devices 100 communicate with the second devices 140 may be a bus, star, or ring topology. The network 180 can be a local area network (LAN), a metropolitan area network (MAN), or a wide area network (WAN) such as the Internet. Although only two first computing devices 100, 100' and two second computing devices 140, 140' are depicted in FIG. 1A, other embodiments include multiple such devices connected to the network 180.

The first and second devices 100, 140 can connect to the network 180 through a variety of connections including standard telephone lines, LAN or WAN links (e.g., T1, T3, 56 kb, X.25), broadband connections (ISDN, Frame Relay, ATM), and wireless connections. Connections can be established using a variety of communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

The first device 100 can be any device capable of receiving and displaying output from applications executed on its behalf by one or more second computing devices 140 and capable of operating in accordance with a protocol as disclosed herein. The first device 100 may be a personal computer, windows-based terminal, network computer, information appliance, X-device, workstation, mini computer, personal digital assistant, or cell phone.

Similarly, the second computing device 140 can be any computing device capable of: receiving from a first computing device 100 user input for an executing application, executing an application program on behalf of a first device 100, and interacting with the first computing device 100 using a protocol as disclosed herein. The second computing device 140 can be provided as a group of server devices logically acting as a single server system referred to herein as a server farm. In one embodiment, the second computing device 140 is a multi-user server system supporting multiple concurrently active connections from one more first devices 100.

Figure 1B:
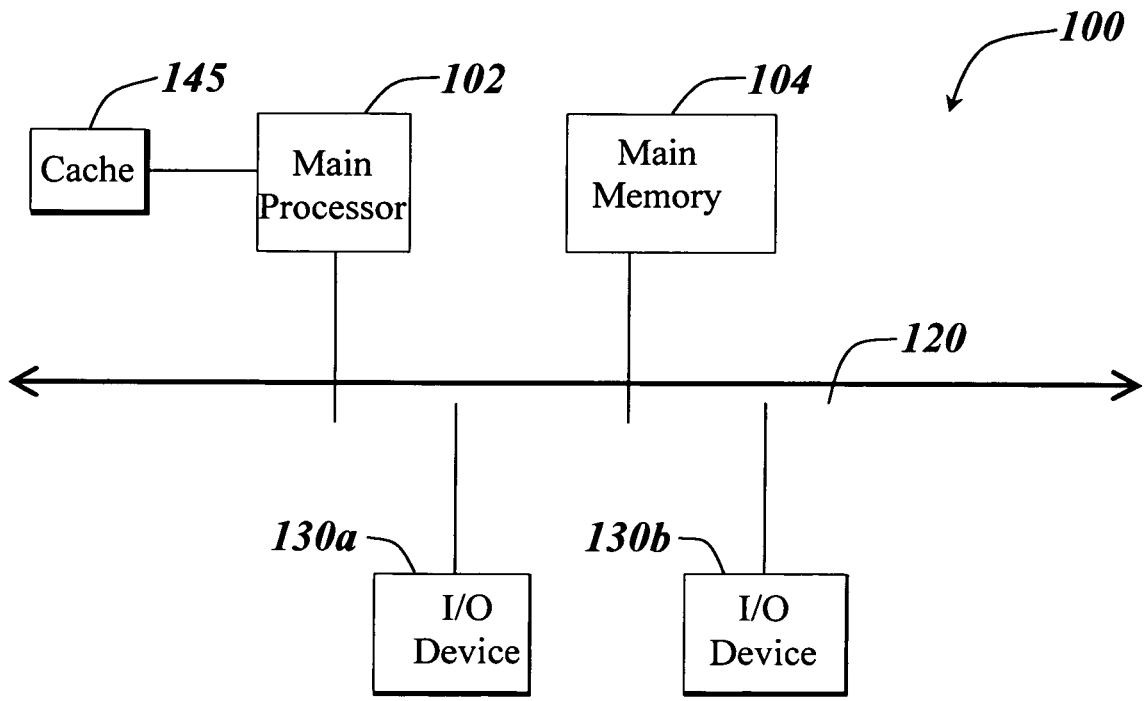
FIG. 1B and 1C are block diagrams depicting embodiments of computers useful in connection with the present invention.
Figure 1C:
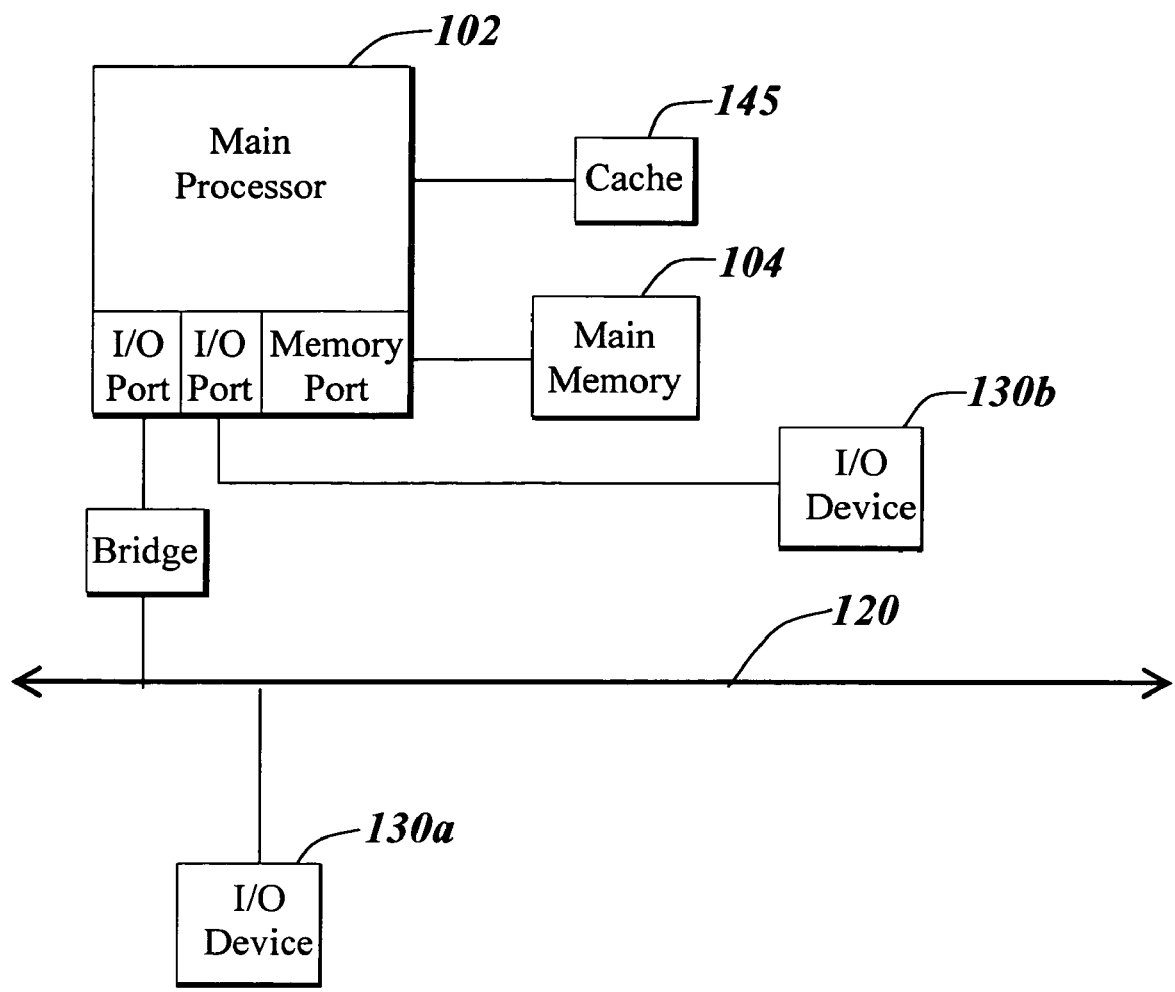

FIGS. 1B and 1C depict block diagrams of a typical computer 100 useful as first computing devices 100 and second computing devices 140. As shown in FIGS. 1B and 1C, each computer 100 includes a central processing unit 102, and a main memory unit 104. Each computer 100 may also include other optional elements, such as one or more input/output devices 130a-130b (generally referred to using reference numeral 130), and a cache memory 145 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 1B, the processor 102 communicates with main memory 104 via a system bus 120 (described in more detail below). FIG. 1C depicts an embodiment of a computer system 100 in which the processor communicates directly with main memory 104 via a memory port. For example, in FIG. 1C the main memory 104 may be DRDRAM.

FIGS. 1B and 1C depict embodiments in which the main processor 102 communicates directly with cache memory 145 via a secondary bus, sometimes referred to as a "backside" bus. In other embodiments, the main processor 102 communicates with cache memory 145 using the system bus 120. Cache memory 145 typically has a faster response time than main memory 104 and is typically provided by SRAM, BSRAM, or EDRAM.

In the embodiment shown in FIG. 1B, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 102 may use an Advanced Graphics Port (AGP) to communicate with the display. FIG. 1C depicts an embodiment of a computer system 100 in which the main processor 102 communicates directly with I/O device 130b via HyperTransport, Rapid I/O, or InfiniBand. FIG. 1C also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, DVD-R drive, DVD-RW drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 1B and 1C typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

In other embodiments, the first device 100 or second device 140 may have different processors, operating systems, and input devices consistent with the device. For example, in one embodiment the first device 100 is a Zire 71 personal digital assistant manufactured by Palm, Inc. In this embodiment, the Zire 71 uses an OMAP 310 processor manufactured by Texas Instruments, of Dallas, Tex., operates under the control of the PalmOS operating system and includes a liquid-crystal display screen, a stylus input device, and a five-way navigator device.

Figure 2:
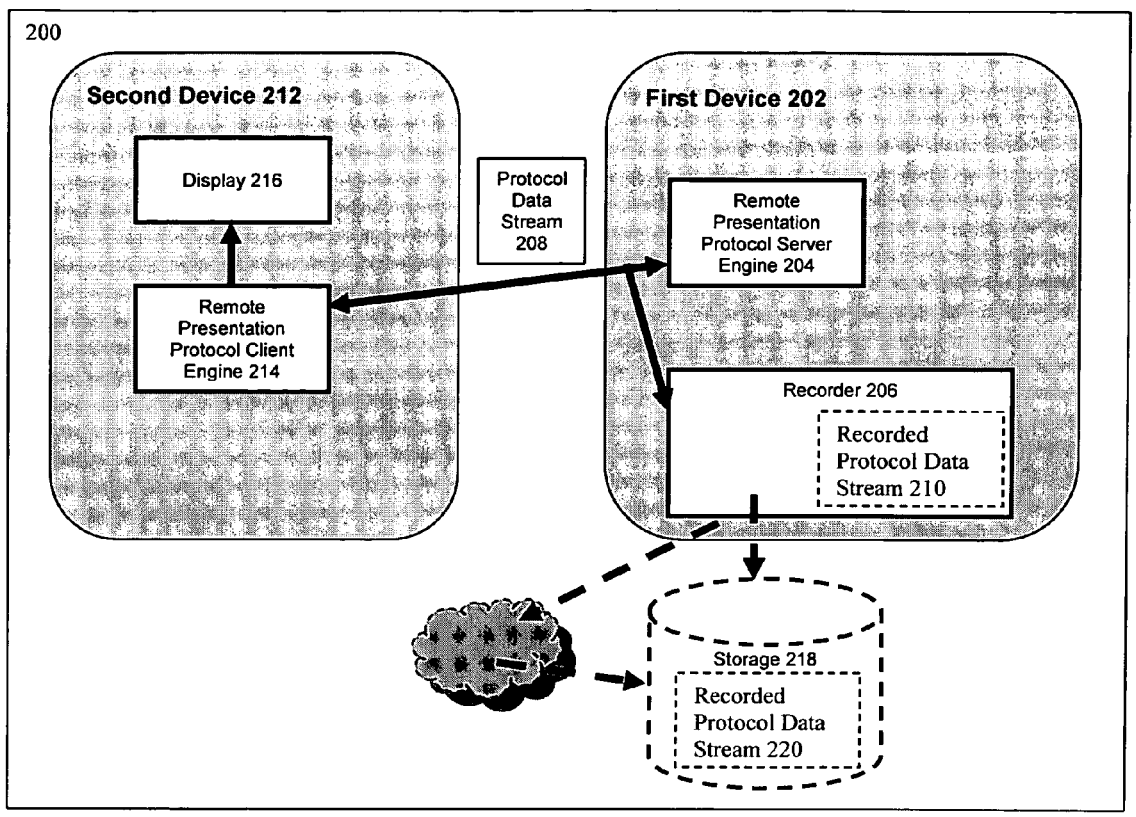
FIG. 2 is a block diagram depicting an embodiment of the network 200 in which the present invention may be performed.

Referring now to FIG. 2, a block diagram depicts an embodiment of the network 200 in which the invention may be performed, including a first device 202, a remote presentation protocol server engine 204, a recorder 206, a protocol data stream 208, a recorded protocol data stream 210, a second device 212, a remote presentation protocol client engine 214, a display 216, a storage element 218, and a recorded protocol data stream 220. In brief overview, the recorder 206 intercepts a protocol data stream 208. The recorder 206 copies at least one packet from the protocol data stream and creates a recording of the protocol data stream 210 using the at least one copied packet.

Referring now to FIG. 2 and in more detail, a first device 202 transmits a protocol data stream 208 to a second device 212. In one embodiment, the first device 202 uses a remote presentation protocol server engine 204 to transmit the protocol data stream 208 to the second device 212. In some embodiments, the second device 212 uses a remote presentation protocol client engine 214 to receive the protocol data stream 208 from the first device 202. In some embodiments, the remote presentation protocols comprise a thin-client protocol such as the ICA protocol, manufactured by Citrix Systems, Inc. of Ft. Lauderdale, Fla., the X protocol, the VNC protocol, or the RDP protocol, manufactured by Microsoft Corporation of Redmond, Wash.

The protocol data stream 208 comprises a plurality of packets at least some of which represent display data. In some embodiments, the protocol data stream 208 comprises information about a recorded session. In one embodiment, the protocol data stream 208 comprises metadata. In another embodiment, the protocol data stream 208 comprises information about the user in a recorded session. In still another embodiment, the protocol data stream 208 comprises information about the server generating the recorded data. In yet another embodiment, the protocol data stream 208 comprises a timestamp.

In one embodiment, the protocol data stream 208 comprises multiple channels. In this embodiment, a channel comprises a peer-to-peer connection over which data is transferred. In another embodiment, the protocol data stream 208 comprises multiple virtual channels. In this embodiment, the virtual channel is a channel wrapped in another channel. The second device 212 receives the protocol data stream 208 and, in some embodiments, uses a remote presentation protocol client engine 214 to regenerate the display data. Processing the protocol data stream 208 allows the second device 212 to present a display to a user through the display 216. The second device 212 may use the remote presentation protocol client engine 214 to process the display data. The display includes, without limitation, audio, visual, tactile, or olfactory presentations, or combinations of these.

The recorder 206 intercepts the protocol data stream 208 sent from the first device 202 to the second device 212. In one embodiment, the recorder 206 intercepts the protocol data stream 208 by intercepting one or more channels. In another embodiment, the recorder 206 intercepts the protocol data stream 208 by intercepting one or more virtual channels. In some embodiments, the recorder 206 monitors one or more virtual channels over which the first device 202 may transmit the protocol data stream 208 to the second device 212. The recorder 206 copies at least one packet from the protocol data stream. In one embodiment, the recorder 206 determines to copy a particular packet of the protocol data stream responsive to a policy. In some embodiments, the policy defines the packets the recorder 206 records based upon the type of data contained within the packet. In other embodiments, the recorder 206 determines to copy a packet of the protocol data stream based upon a determination of whether the packet contains data. In some of these embodiments, the recorder 206 does not record empty packets while in others of these embodiments, the recorder 206 does record empty packets. In some embodiments, the recorder 206 records every packet in the protocol data stream 208.

The recorder 206 creates a recorded protocol data stream 210 using the at least one copied packet. In one embodiment, the recorder 206 associates information with the at least one copied packet. In one embodiment, the recorder 206 associates a time stamp with the at least one copied packet. In another embodiment, the recorder 206 associates a data length indicator with the packet. For embodiments where the recorder 206 associates information with the at least one copied packet, for example time stamps or data length indicator, the recorder 206 may embed this information into the recorded protocol data stream 210 in addition to the packet or the recorder 206 may embed this information directly into the packet, or the recorder 206 may store the association in a location separate from the packet and the recorded protocol data stream 210.

Figure 3:
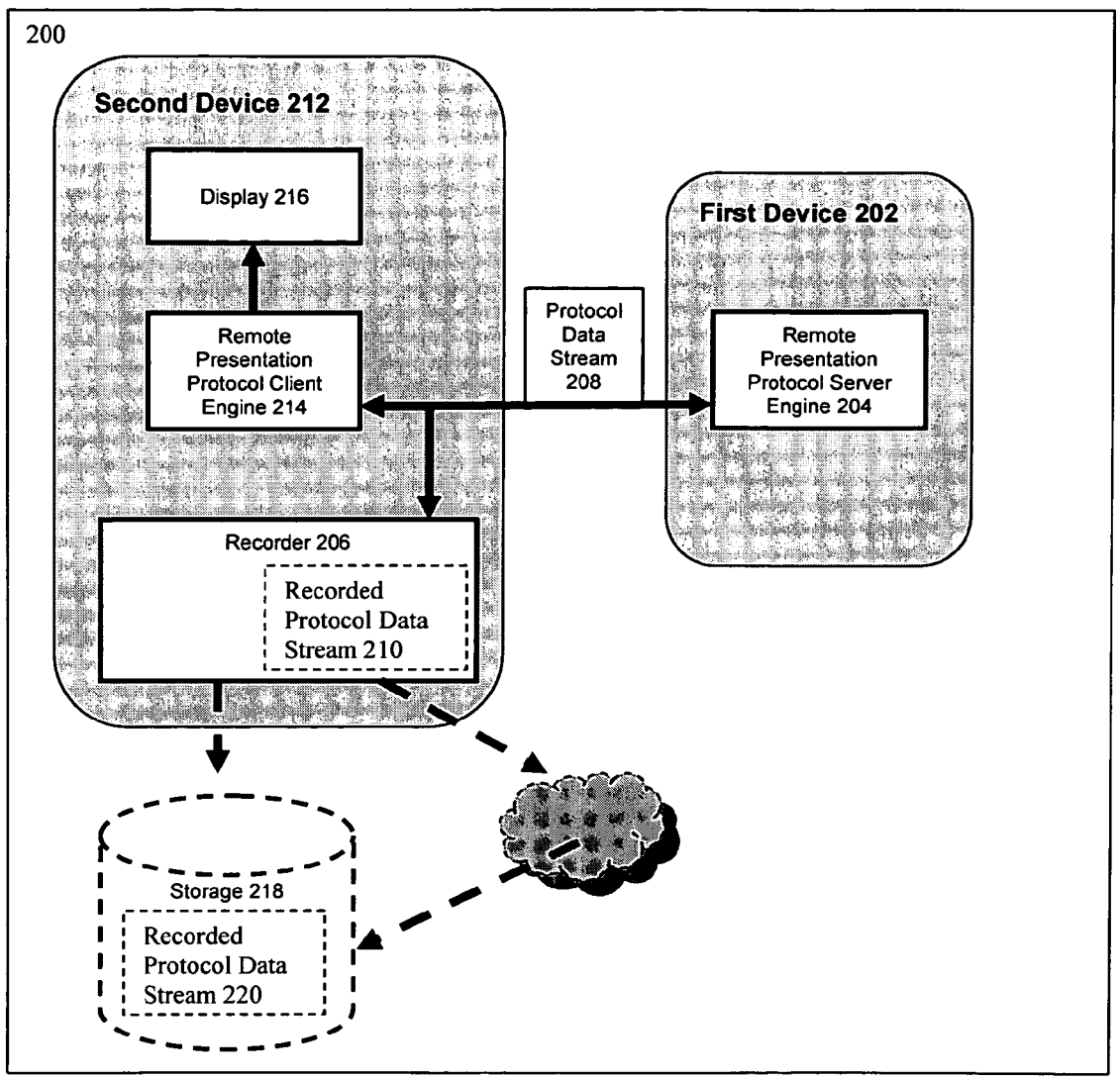
FIG. 3 and FIG. 4 are block diagrams depicting alternate embodiments of placements for a recorder on the network 200.
Figure 4:
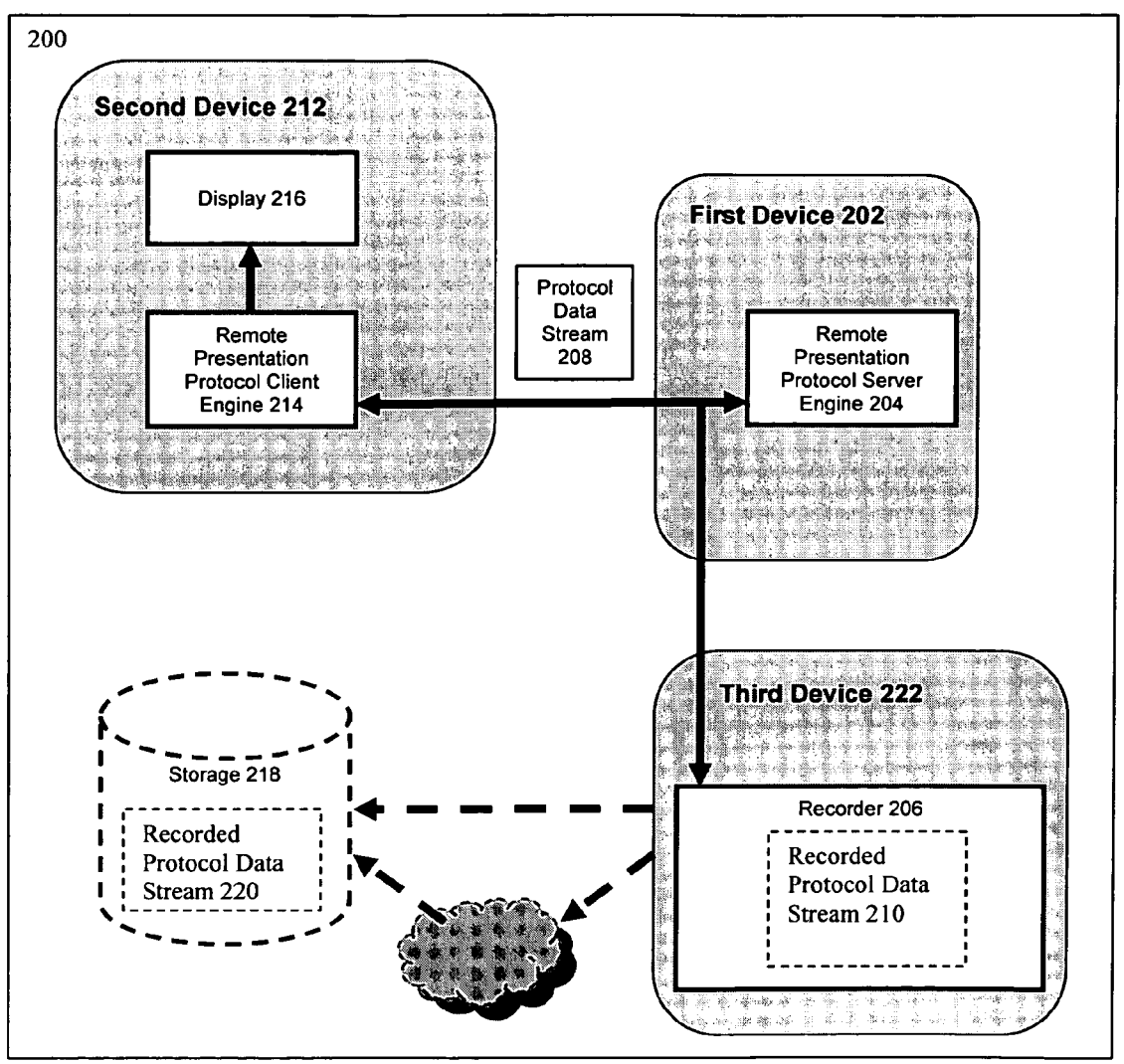

As depicted in FIG. 2, the recorder 206, may reside on the first device 202. FIG. 3 depicts an embodiment in which the recorder 206 resides on the second device, where the recorder 206 resides on the second device 212. FIG. 4 depicts an embodiment in which the recorder 206 resides on a third device. The devices on which the recorder 206 may reside include client computing systems, server computing systems, proxy server computing systems, network packet sniffing computing systems, protocol analyzer computing systems, and passthrough server computing systems.

The recorder 206 creates the recorded protocol data stream 210 using the at least one copied packet and, in some embodiments, information associated with the at least one copied packet. In some embodiments, the recorder 206 stores the recording of the protocol data stream 210 after creating it. In some of these embodiments, the recorder 206 stores the recording of the protocol data stream 210 to a storage element 218. The storage element 218 may comprise persistent storage, such as a hard drive, floppy drive, CD-RW, DVD-RW, or any other device, which maintains data state when power is removed. In other embodiments, the storage element may comprise one or more volatile memory elements, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In one embodiment the storage element comprises a network storage device. The storage element 218 may reside on the first device 202 or on a second device 212. In other embodiments, the storage element 218 resides on a third device, such as a proxy server computing device or a passthrough server computing device. In still other embodiments, the storage element 218 resides on a network and the recorder 206 accesses the storage element 218 over the network to store the recording of the protocol data stream 220. In other embodiments, the recorder 206 stores the recording of the protocol data stream on the same device on which the recorder 206 resides.

Figure 5:
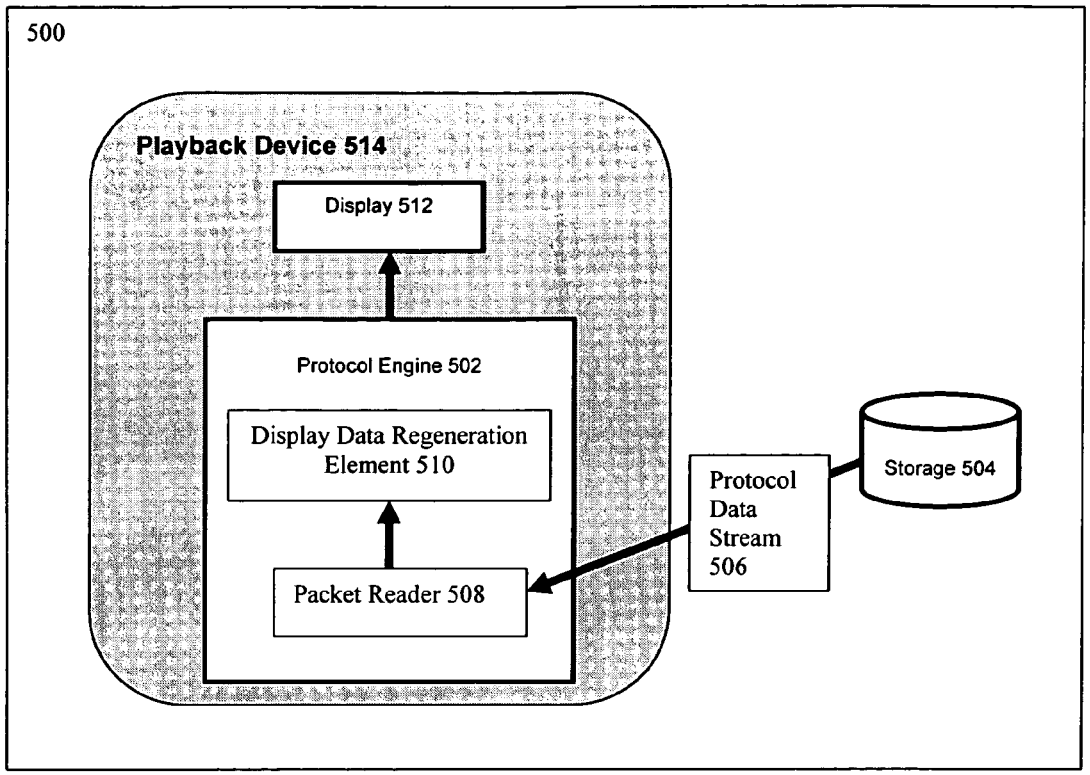
FIG. 5 is a block diagram depicting one embodiment of a system for regenerating display data represented by a protocol data stream.

Referring now to FIG. 5, a block diagram depicts a protocol engine 502 reading at least one copied packet from the recording of the protocol data stream 506 and using the information associated with the at least one copied packet to regenerate the display data represented by the protocol data stream 506. The protocol engine 502 receives the protocol data stream 506. In some embodiments, the protocol engine 502 retrieves the protocol data stream 506 from a storage element 504. In other embodiments, the protocol engine 502 retrieves the protocol data stream 506 from a recorder 206. In still other embodiments, the protocol engine 502 retrieves the protocol data stream 506 from another computing device.

In some embodiments, the protocol engine 502 comprises a packet reader 508 and a display data regeneration element 510. In these embodiments, the packet reader 508 reads at least one copied packet from the recording of the protocol data stream 506. In some embodiments, the packet reader 508 reads the at least one copied packet sequentially from the recording of the protocol data stream 506.

The protocol engine 502 processes the at least one copied packet and any information associated with the at least one copied packet. The protocol engine 502 uses, in some embodiments, a display data regeneration element 510 for the processing. The packet contains data enabling the regeneration of a perceptible display presented to a user. In some embodiments, a second device 212 processed this data, as shown in FIG. 2. In one embodiment, processing includes rendering to a buffer the contents of the at least one copied packet. In another embodiment, processing includes rendering in a perceptible manner the contents of the at least one copied packet. The regenerated display may include, without limitation, audio, visual, tactile, or olfactory presentations, or combinations of these.

In some embodiments, the protocol engine 502 resides on the first device 202. In other embodiments, the protocol engine 502 resides on the second device 212. In still other embodiments the protocol engine resides on a third device, such as a proxy server computing device or a passthrough server computing device.

Figure 7:
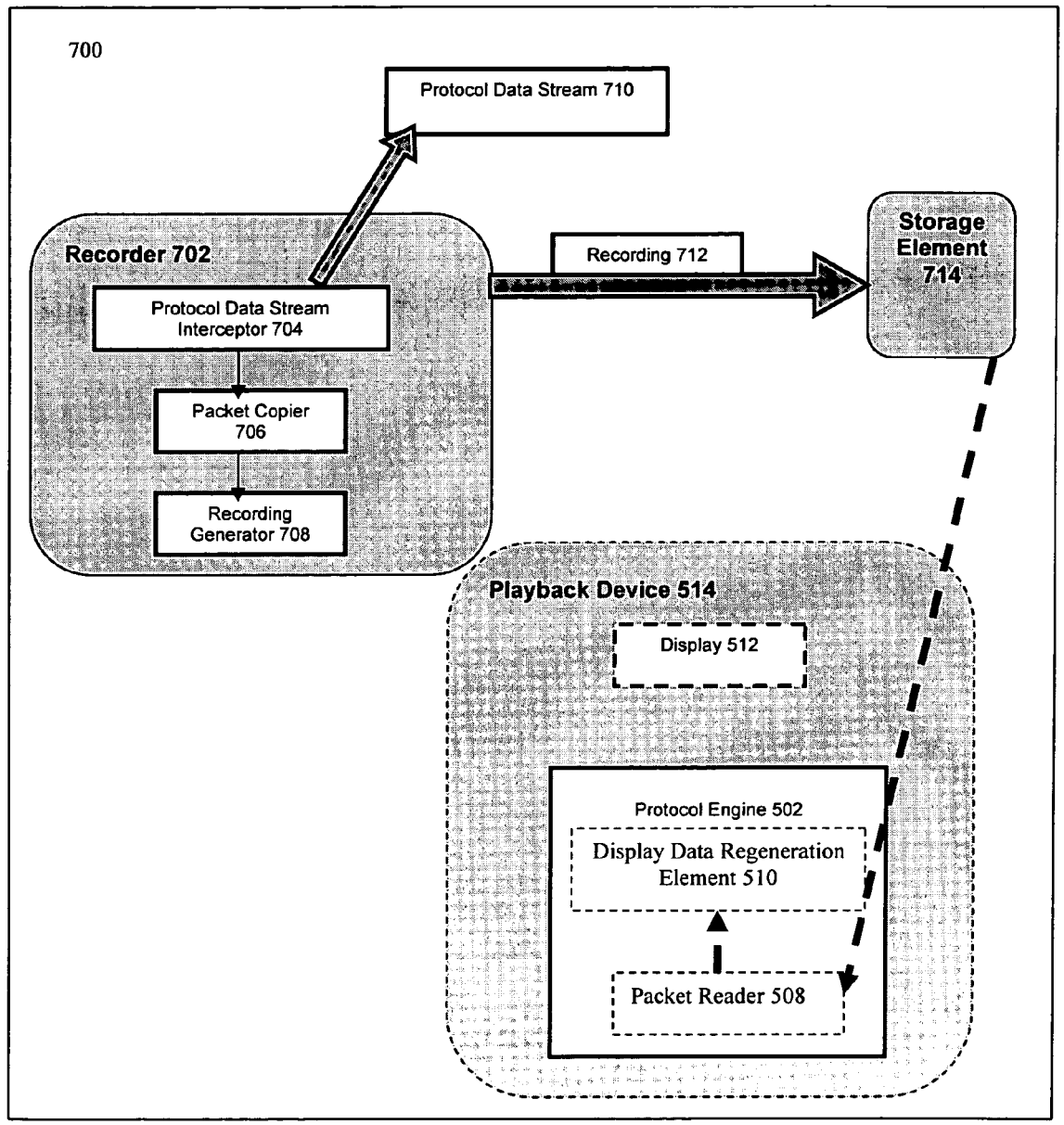
FIG. 7 is a block diagram depicting in greater detail a recorder in a system for recording display data represented by a protocol data stream.

Referring ahead now to FIG. 7, a block diagram depicts in greater detail the recorder 702, originally described as recorder 206 in FIG. 2. In brief overview, the recorder 702 records server-generated data through interception of a protocol data stream 710 and through the creation of a recording 712 of the protocol data stream 710.

The recorder 702 includes, in one embodiment, a protocol data stream interceptor 704, a packet copier 706, and a recording generator 708. In one embodiment, the recorder 702 uses the protocol data stream interceptor 704 to monitor the protocol data stream 710. In another embodiment, the recorder 702 uses the protocol data stream interceptor 702 to intercept a protocol data stream 710 comprising a plurality of packets transmitted from a first device 202 to a second device 212. The packet copier 706 copies at least one packet of the protocol data stream. The packet copier 706 determines whether or not to copy a packet in the protocol data stream. In some embodiments, the packet copier 706 makes this determination responsive to a policy. In these embodiments, the packet copier 706 may determine to copy a packet based on whether or not the packet contains any data or on the type of data contained within the packet.

In one embodiment, the recorder 702 utilizes a recording generator 708 to create a recording of the protocol data stream using the at least one copied packet. The recording generator assembles the at least one copied packet into a recording 712 of the protocol data stream 710. In some embodiments, the recording generator 708 embeds information into the recording of the protocol data stream. This information may comprise, without limitation, time references indicating when to regenerate the display data represented by the data contained within the packet, data length indicators descriptive of the data contained within the packet, or other types of information used to regenerate the display data represented by the data contained within the protocol data stream 710.

Figure 8:
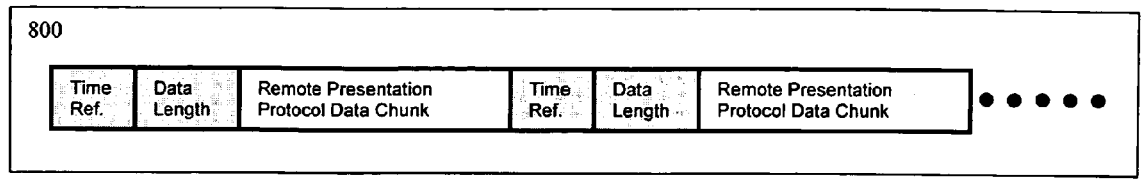
FIG. 8 depicts one embodiment of a recording of a protocol data stream.

FIG. 8 depicts one embodiment of the recording 712 of the protocol data stream 710. In the embodiment shown, the recording generator 708 has grouped at least one copied packet into remote presentation protocol data chunks. The recording generator 708 associated a time reference and a data length with each remote presentation protocol data chunk and assembled the information and the packets together into the recording 712 of the protocol data stream 710.

Referring back to FIG. 7, in one embodiment, the recorder 702 stores the completed recording 712 of the protocol data stream 710 to a storage element 714. In some embodiments, the storage element is located on a network and the recorder 702 transmits the recording 712 over a network to the storage element 714. In other embodiments, the storage element is located on a proxy server computing device. In still other embodiments, the storage element is located on a passthrough server computing device. In some embodiments, the storage element 714 resides on the same device as the recorder 702.

In one embodiment, depicted in shadow by FIG. 7, a system for recording and playback of a protocol data stream comprises the recorder 702 as well as the playback device 514 discussed in FIG. 5. The playback device 514 includes the protocol engine 502, which uses the packet reader 508 to receive and read at least one copied packet from the recording 712 of the packet data stream and uses the embedded information to regenerate the display data represented by the recording 712 of the protocol data stream. In some embodiments, the protocol engine 502 reads the packets sequentially in regenerating the display data.

In another embodiment depicted by FIG. 7, a system for recording and replaying server-generated data comprises a recorder 702, a storage element 714, and a protocol engine 502. The recorder 702 generates a recording of a protocol data stream and stores the recording 712 in the storage element 714. The recorder copies at least one packet from the protocol data stream and associates information with the at least one packet, including but not limited to a time reference or a data length indicator describing a length of data in the packet. The protocol engine 502, in communication with the storage element 714, reads at least one packet from the recording of the protocol data stream and uses information associated with the at least one packet to regenerate the display data represented by the recording 712 of the protocol data stream 710.

In one embodiment, the recorder 702, protocol engine 502, or storage element 714 may be located, together or separately on the first device 202. In other embodiments, they may be located, together or separately, on the second device 212. In still other embodiments, they may reside, together or separately, on a third device, such as a proxy server computing device, a network packet sniffer, or a passthrough server computing device. In yet other embodiments, the storage element 714 may reside on a storage area network separately from the recorder 702 and the protocol engine 502.

Figure 6:
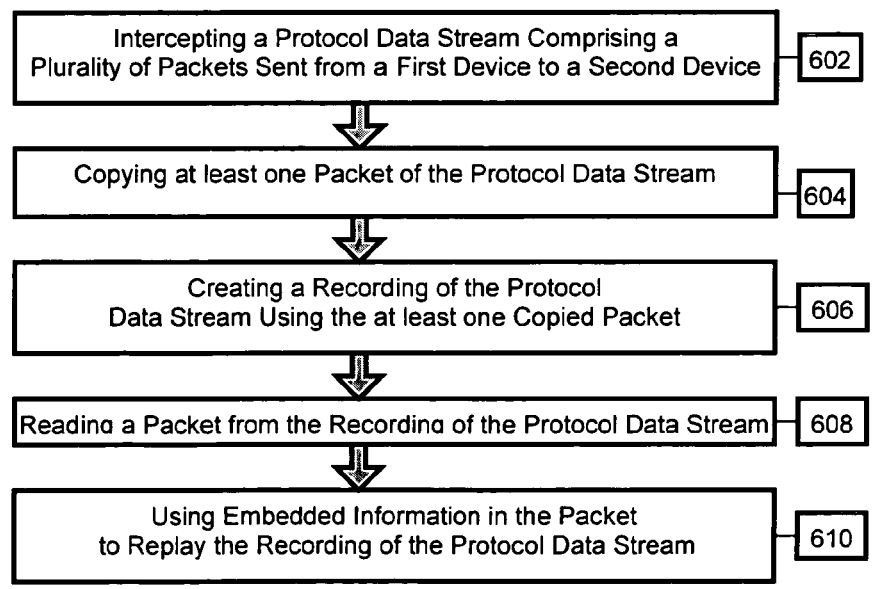
FIG. 6 is a flow diagram depicting a method for recording and replaying server-generated data.

Referring back to FIG. 6, a flow diagram summarizes a method for recording and replaying server-generated data. In brief overview, a recorder 206 intercepts a protocol data stream 208 comprising a plurality of packets transmitted from a first device 202 to a second device 212 (step 602). The recorder 206 copies at least one packet from the protocol data stream 208 (step 604) and creates a recording of the protocol data stream 210 (step 606) which a protocol engine 502 later uses in regenerating display data represented by the recorded protocol data stream 210 (steps 608, 610).

A recorder 206 intercepts a protocol data stream 208 comprising a plurality of packets, representing display data transmitted from a first device 202 to a second device 212. The recorder 206 copies at least one packet of the protocol data stream 208. The recorder 206 creates a recording of the protocol data stream using the at least one copied packet. The recorder 206, in some embodiments, associates information with the at least one copied packet. The information may comprise a time stamp or a data length indicator. In some of these embodiments, the recorder 206 embeds the information associated with the packet into the recording of the protocol data stream 210. In others of these embodiments, the recorder 206 stores the information associated with the packet in a separate protocol data stream. In still others of these embodiments, the recorder stores the information associated with the packet in a data store. A protocol engine 502 reads the at least one copied packet from the recording of the protocol data stream 210 and uses information associated with the at least one copied packet to regenerate the display data represented by the protocol data stream 210.

Figure 11:
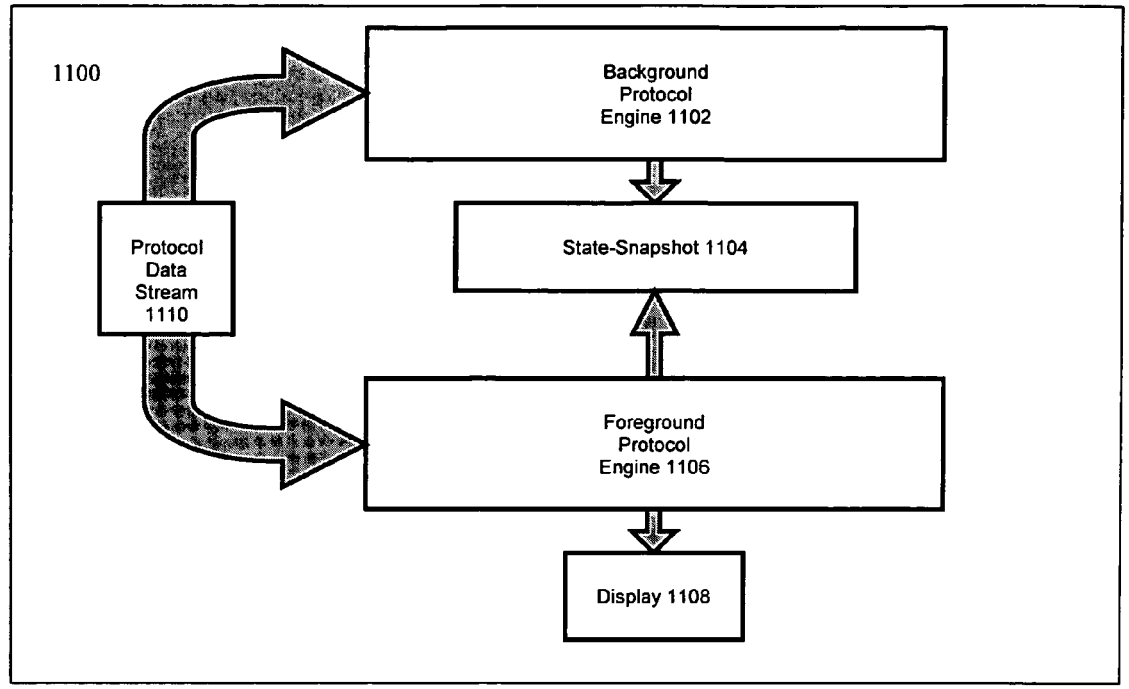
FIG. 11 is a block diagram depicting a system for real-time seeking during playback of stateful remote presentation protocols.

Referring ahead now to FIG. 11, a block diagram depicts a system for real-time seeking during playback of stateful remote presentation protocols. In brief overview, this figure depicts an embodiment of a playback device 514 (see FIG. 5 above) comprising two protocol engines 502, a background protocol engine 1102 and a foreground protocol engine 1106, as well as a state-snapshot 1104 and a display 1108. The background protocol engine 1102 receives a recording of a protocol data stream 1110 and reads the recording of the protocol data stream 1110, which comprises a plurality of packets and represents display data. In one embodiment, the playback device 514 regenerates the display data by rendering the contents of at least one packet in the protocol data stream 1110 and displaying the results using the display 1108. The results include, without limitation, perceptible audio, visual, tactile, or olfactory presentations.

Referring now to FIG. 11, and in greater detail, the background protocol engine 1102 enables a recipient of the rendered display data to seek for content in real-time during the presentation of a protocol data stream 1110. The background protocol engine 1102 generates at least one state-snapshot 1104 while reading at least one packet from the protocol data stream 1110. In one embodiment, the background protocol engine 1102 renders the contents of the at least one packet to a buffer. In this embodiment, the buffer may comprise an off-screen buffer. In this embodiment, the background protocol engine 1102 generates at least one state-snapshot 1104 as it renders the contents of the at least one packet. The background protocol engine 1102 makes the state-snapshot 1104 available to the foreground protocol engine 1106.

The state-snapshot 1104 enables regeneration of display data because it stores a state of a protocol engine rendering the protocol data stream 1110 at a point in time when a recorder 206 copied at least one packet from the protocol data stream 208 into the recording of the protocol data stream 1110. In one embodiment, the state-snapshot 1104 comprises a data structure describing a state of a screen at a point in time. In another embodiment, the state-snapshot 1104 represents all the variables, images and data components that make up the state of a protocol engine at a reference point in the protocol data stream 1110. The foreground protocol engine 1106 also receives the recording of the protocol data stream 1110 and renders the contents of the at least one packet in the protocol data stream 1110 by recreating the state of the protocol engine which originally rendered the protocol data stream 1110. In one embodiment, the foreground protocol engine 1106 uses the contents of the state-snapshot 1104 to render the contents of the at least one packet.

In one embodiment, the state-snapshot 1104 comprises a data structure. In other embodiments, the state-snapshot 1104 comprises a database. In one embodiment, the contents of the state-snapshot 1104 include display data regarding the state of a visible surface. In another embodiment, the contents of the state-snapshot 1104 include display data regarding the state of an off-screen surface. In yet another embodiment, the contents of the state-snapshot 1104 include display data regarding the state of a drawing object. In some embodiments, the contents of the state-snapshot 1104 include display data regarding the state of a color palette. In other embodiments, the contents of the state-snapshot 1104 include display data regarding the state of a cached object. In still other embodiments, the contents of the state-snapshot 1104 include display data regarding the state of a buffer.

The foreground protocol engine 1106 receives the recording of the protocol data stream 1110 and uses the state-snapshot 1104 to identify a packet containing the representation of the requested digital data and to render the packet. In some embodiments, the foreground protocol engine 1106 generates a real-time perceptible representation of the recording of the protocol data stream 1110 for presentation to a viewer using the display 1108. In some embodiments, the foreground protocol engine 1106 generates the real-time perceptible representation by rendering the contents of at least one packet in the protocol data stream 1110. The perceptible representation may include, without limitation, separately or together, audio, visual, tactile, or olfactory presentations.

In one of the embodiments in which the foreground protocol engine 1106 renders the contents of at least one packet in the protocol data stream 1110, the foreground protocol engine 1106 initiates rendering the contents of at least one packet in the protocol data stream 1110 simultaneous to the rendering by the background protocol engine 1102. However the background protocol engine 1102 renders only to a buffer and completes the rendering and the generation of the at least one state-snapshot 1104 prior to the completion of the real-time perceptible rendering initiated by the foreground protocol engine 1106, which, in one embodiment, renders to both a buffer and in a perceptible manner. In one embodiment, the background protocol engine 1102 renders the protocol data stream 1110 at a maximum possible speed regardless of any timestamps associated with the recording which would otherwise specify a time for rendering. Therefore, at least one state-snapshot 1104 is available to the foreground protocol engine 1106 during its generation of a real-time perceptible representation of the recording of the protocol data stream 1110.

In one embodiment, the foreground protocol engine 1106 renders the contents of the plurality of packets within the recording of the protocol data stream 1110 in a sequential manner. In this embodiment, the display data rendered and presented to the user presents the display in the order in which it occurred at the time the protocol data stream was recorded. The recording of the protocol data stream 1110 may include information, such as time stamps, for use by the foreground protocol engine 1106 in rendering the display data sequentially. In some embodiments, the foreground protocol engine 1106 renders the display data in real-time. When the foreground protocol engine 1106 receives a request to regenerate a particular display data represented by a particular packet in the recording of the protocol data stream 1110, the foreground protocol engine 1106 renders the requested display data using the contents of the identified state-snapshot 1104.

In some embodiments, the background protocol engine 1102 and the foreground protocol engine 1106 reside on the same device. In other embodiments, the background protocol engine 1102 and the foreground protocol engine 1106 reside on separate devices.

Figure 9:
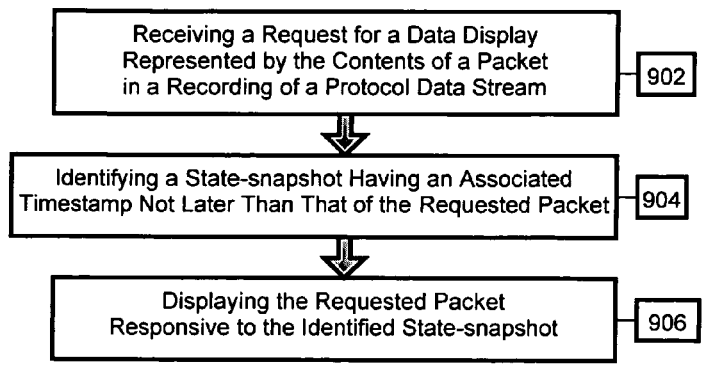
FIG. 9 is a flow diagram depicting one embodiment of the steps taken in a method for real-time seeking during playback of stateful remote presentation protocols.

Referring back now to FIG. 9, a flow diagram depicts one embodiment of the steps taken in a method for real-time seeking during playback of stateful remote presentation protocols. In brief overview, there is a request for rendering of data display represented by the contents of a packet in a recording of a protocol data stream (step 902). The contents of the appropriate packet are rendered by first identifying a state-snapshot having an associated timestamp not later than a timestamp associated with the requested packet (step 904) and rendering the requested contents responsive to the identified state-snapshot (step 906).

In one embodiment, the foreground protocol engine 1106 receives a request to render the contents of a packet in a recording of a protocol data stream 1110. The protocol data stream 1110 comprises a plurality of packets whose contents represent display data. In some embodiments, the request results when the foreground protocol engine 1106 regenerates display data by rendering the contents of a packet in a recording of a protocol data stream 1110 to a viewer using the display 1108 and the viewer wishes to seek for a particular display data.

The foreground protocol engine 1106 identifies a state-snapshot 1104 having an associated timestamp not later than a time stamp associated with the requested packet. The foreground protocol engine 1106 displays the display data represented by the contents of the requested packet responsive to the identified state-snapshot 1104. In one embodiment, the identified state-snapshot 1104 indicates the exact packet from the protocol data stream 1110 whose contents the foreground protocol engine 1106 may render to provide the user with the requested display data.

In other embodiments, the identified state-snapshot 1104 comprises a state of a protocol engine rendering the protocol data stream at a point in time when a recorder copied a packet from the protocol data stream 1110 but the display data represented by the contents of the copied packet precede the display data requested by the viewer. In some of these embodiments, there are multiple packets between the state-snapshot and the packet containing the representation of the requested display data. In some of those embodiments, the foreground protocol engine 1106 renders the contents of the intermediate packet or packets only to an off-screen buffer. The foreground protocol engine 1106 then renders the packet whose contents represent the display data both to an off-screen buffer and to the user in a perceptible manner. In one embodiment, the foreground protocol engine 1106 presents the display data represented by the contents of the intermediate packets in a perceptible manner prior to the display data represented by the contents of the requested packet.

Figure 10:
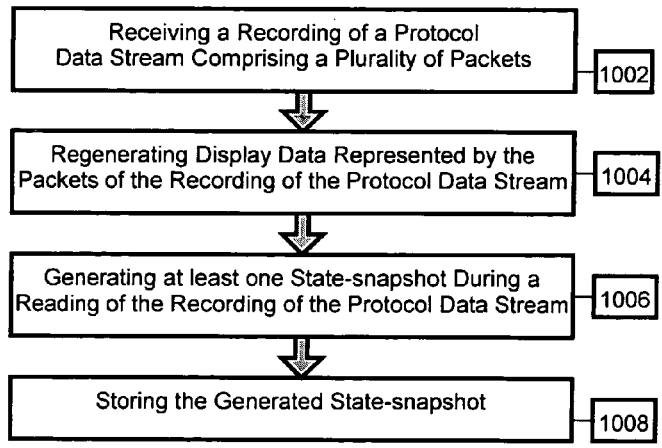
FIG. 10 is a flow diagram depicting one embodiment of the steps taken to generate state-snapshots enabling real-time seeking during playback of remote presentation protocols.

Referring now to FIG. 10, a flow diagram depicts one embodiment of the steps taken to generate state-snapshots enabling real-time seeking during playback of remote presentation protocols. In brief overview, the background protocol engine 1102 receives a recording of a protocol data stream 1110 and while regenerating display data represented by the contents of the plurality of packets within the protocol data stream 1110, generates at least one state-snapshot.

The background protocol engine 1102 receives a recording of a protocol data stream 1110 comprising a plurality of packets (step 1002). The background protocol engine 1102 generates a representation of the recording of the protocol data stream. In one embodiment, the background protocol engine 1102 generates the representation by rendering the contents of the plurality of packets to a buffer. In some embodiments, the buffer is an off-screen buffer.

In some embodiments, the foreground protocol engine 1106 also receives the recording of the protocol data stream 1110. In these embodiments, the foreground protocol engine 1106 generates a human-perceptible representation of the recording of the protocol data stream, although, as discussed above, the foreground protocol engine 1106 renders both to an off-screen buffer and in a perceptible manner (step 1004). In one of these embodiments, the foreground protocol engine 1106 generates a human-perceptible representation of the recording of the protocol data stream 1110 by rendering the contents of the plurality of packets substantially simultaneously with the background protocol engine 1102 generating at least one state-snapshot during its reading of the recording of the protocol data stream.

After the reading of the at least one packet in the recording of the protocol data stream 1110, the background protocol engine 1102 generates at least one state-snapshot (step 1006). In one embodiment, the background protocol engine 1102 generates at least one state-snapshot during a sequential reading of the recording of the protocol data stream 1110. In another embodiment, the background protocol engine 1102 reads the at least one packet in the recording of the protocol data stream 1110 substantially simultaneously with a rendering of the contents of the packet to a buffer. In one embodiment, the background protocol engine 1102 then stores the generated state-snapshot 1104 (step 1008). In embodiments where the background protocol engine 1102 generates multiple state-snapshots periodically, the state-snapshots may act as markers throughout the recording of the protocol data stream 1110, assisting in the location of a particular point in time in the protocol data stream 1110 and of the packets that come before or after the state-snapshot 1104.

Figure 12:
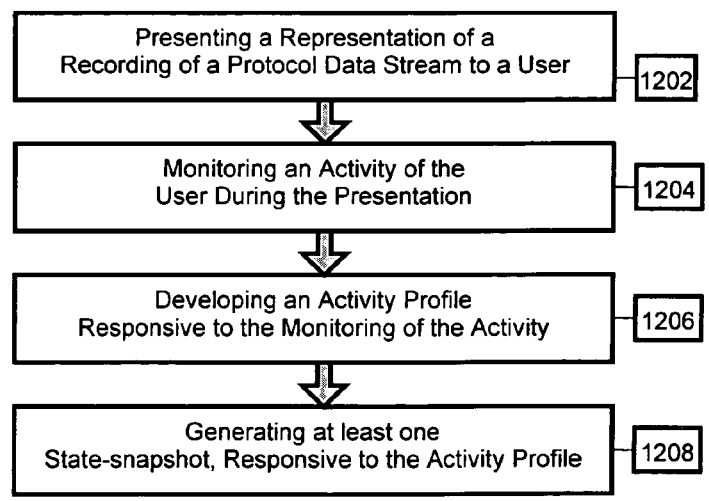
FIG. 12 is a flow diagram depicting one embodiment of steps taken for adaptive generation of state-snapshots.

Referring ahead now to FIG. 12, a flow diagram depicts one embodiment of steps taken for adaptive generation of state-snapshots. In brief overview, the background protocol engine 1102 monitors an activity of a viewer and generates one or more state snapshots 1104 responsive to the level of activity of a viewer.

During a presentation of a representation of a recording of a protocol data stream 1110 to a user (step 1202), a background protocol engine 1102 monitors an activity of the user (step 1204). In one embodiment, the foreground protocol engine 1106 generates the representation of the recording of the protocol data stream 1110 and presents it to the user with the display 1108. In other embodiments, the background protocol engine 1102 generates the representation. In still other embodiments, a third device generates the representation.

The background protocol engine 1102 monitors an activity of the user during the presentation (step 1204). By monitoring the activity of the user, the background protocol engine 1102 develops an activity profile responsive to the monitoring of the activity (step 1206). The background protocol engine generates at least one state-snapshot 1104 responsive to the developed activity profile (step 1208).

In some embodiments, the background protocol engine 1102 identifies a level of activity of the user. In some embodiments, the background protocol engine 1102 identifies a period of inactivity. In other embodiments, the background protocol engine 1102 identifies an area of interest to the user in the display data. The activity profile reflects these identifications.

The background protocol engine 1102 generates at least one state-snapshot responsive to the activity profile. In some embodiments, the background protocol engine 1102 determines to extend an interval between one or more state-snapshots. In other embodiments, the background protocol engine 1102 determines to reduce an interval between one or more state-snapshots. In still other embodiments, the background protocol engine 1102 determines to remove the at least one state-snapshot, responsive to the activity profile. In still other embodiments, the background protocol engine 1102 determines to add at least one state-snapshot, responsive to the activity profile.

Figure 13:
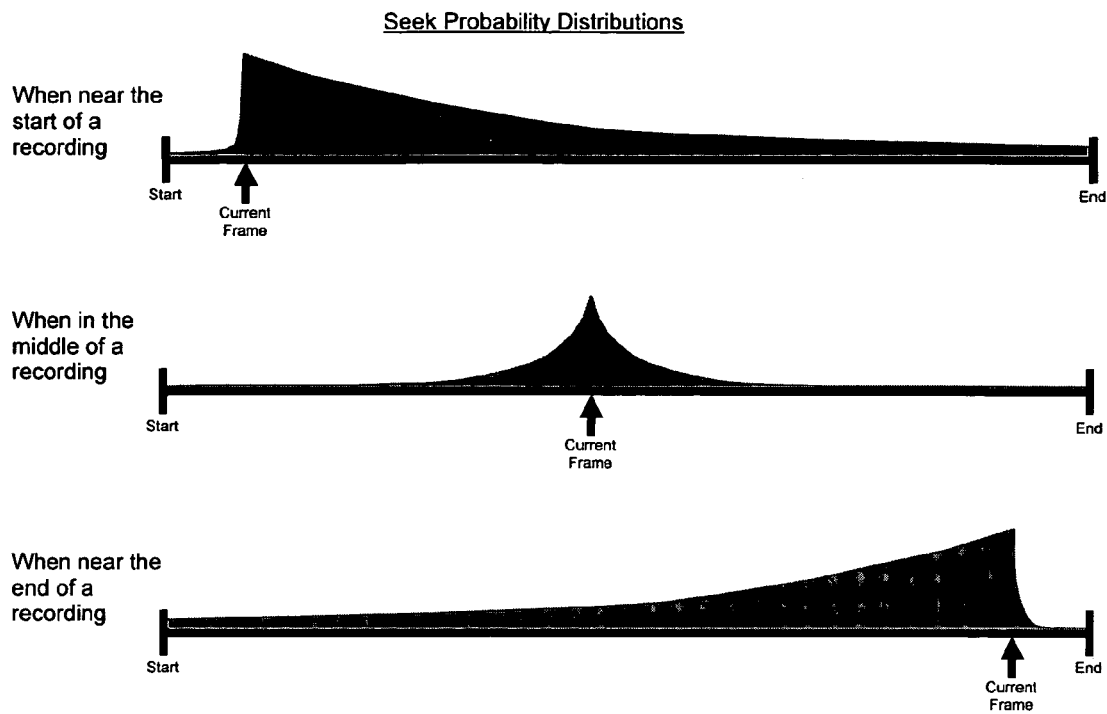
FIG. 13 is a diagram depicting three types of seek probability distributions of one embodiment.

In one embodiment, the background protocol engine 1102 identifies a predicted statistical distribution of seek probabilities. FIG. 13 is a diagram depicting three types of seek probability distributions of one embodiment. In this embodiment, the background protocol engine 1102 collects and stores data about the seek requests made by a user. In one embodiment, the data includes how regularly the user makes a seek request. In one embodiment, the data includes the range, of each seek request—the distance between the requested display data and the current display data presented to the user by rendering the contents of a packet in the recording of the protocol data stream 1110. The range may be described in units of time or relative to the length of the entire recording of the protocol data stream 1110. In one embodiment, the timestamp at which the seek request was made is recorded.

Figure 14:
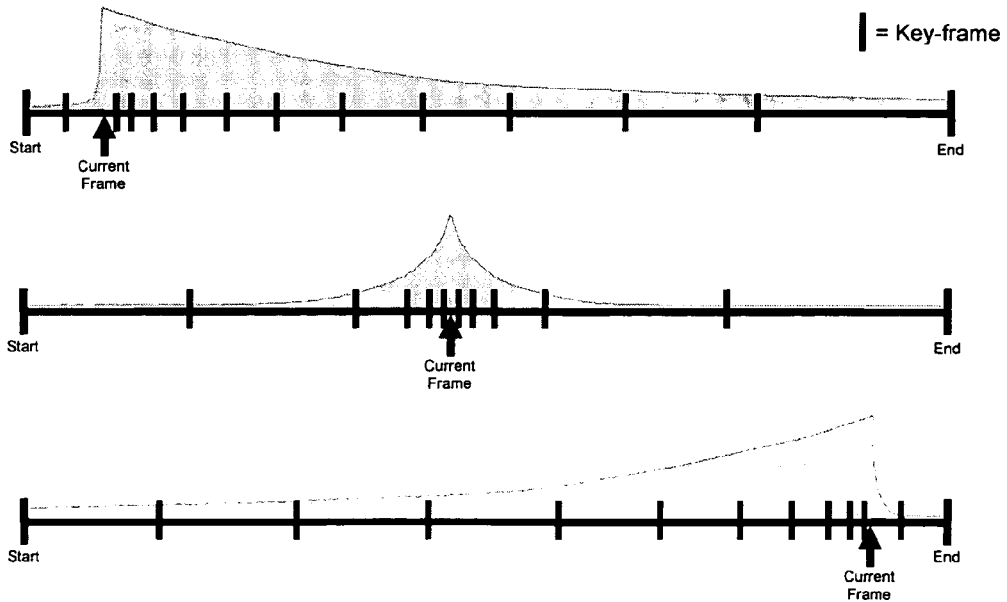
FIG. 14 is a diagram depicting one embodiment of generating state-snapshots responsive to a determined seek probability distribution.

Referring ahead to FIG. 14, a diagram depicts one embodiment of generating state-snapshots responsive to a determined seek probability distribution. The background protocol engine 1102 uses the collected seek request data to generate a seek probability distribution graph centered on the currently presented display data. The background protocol engine 1102 assigns each position in the stream a value indicating the estimated probability the user will request to seek to the display data associated with that position. With this data, the background protocol engine 1102 determines where to place generated state-snapshots 1104 and generates the at least one state-snapshot 1104 responsive to the statistical distribution of seek probabilities.

Figure 15:
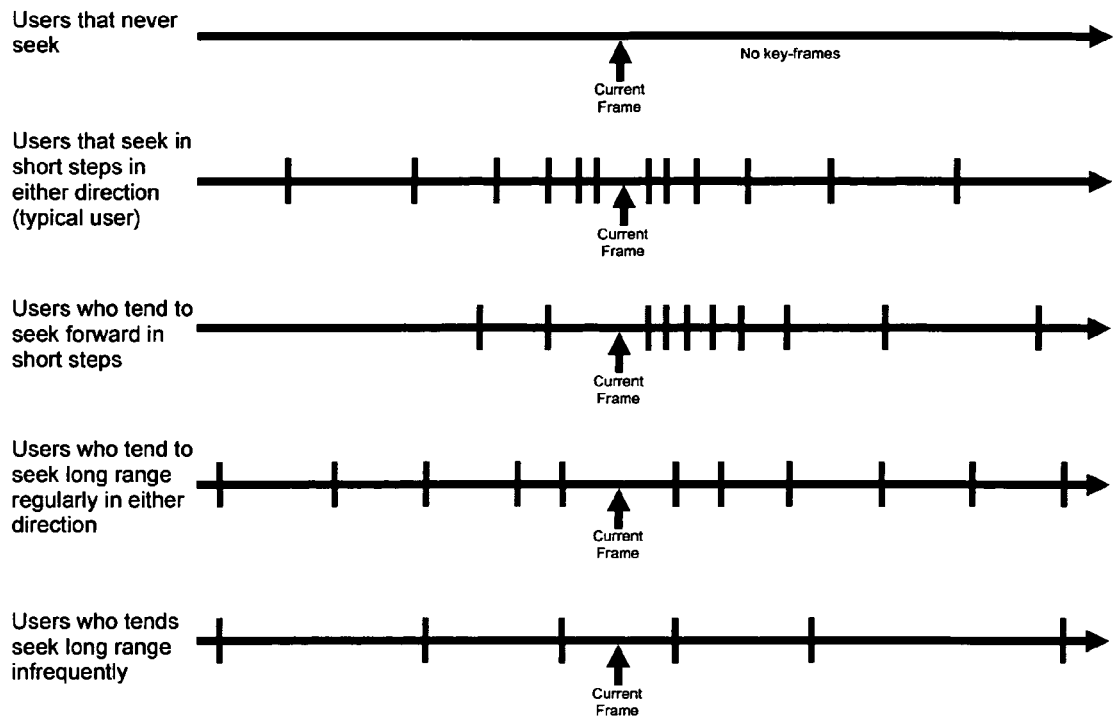
FIG. 15 depicts one embodiment of a usage pattern for a user of a presentation of a protocol data stream.

FIG. 15 depicts one embodiment of a usage pattern of the user. In one embodiment, the background protocol engine 1102 develops an activity profile for a user based upon a usage pattern of the user. The usage pattern reflects identified seek probabilities. Areas of higher seek probability will be provided with a higher state-snapshot density and areas of lower seek probability will be provided with a lower state-snapshot density. In some embodiments, the distance between any pair of state-snapshot is inversely proportional to the average seek probability between them. The background protocol engine 1102 expects the user to seek to higher probability areas, therefore the majority of seeks will be fast as the spacing between generated state-snapshots 1104 is relatively short. To ensure no individual seek request is excessively slow, in one embodiment the background protocol engine 1102 will impose an upper bound on the spacing of generated state-snapshots 1104 even when the seek probability is very low. Likewise, in another embodiment a lower bound prevents placing state-snapshots too close together in very high probability areas. In some embodiments, the amount of rendering between adjacent state-snapshots is considered when determining state-snapshot placement, to minimize latency.

For embodiments with new users or users without a distinguishable usage pattern, the background protocol engine 1102 applies a default state-snapshot generation pattern. This pattern assumes most seeking will occur close to the current frame in either direction, but long range seek performance must only be at best satisfactory. The typical user will demand high performance when jogging back-and-forth around the current frame as many small seek steps can be achieved with jog wheel input device. Seeking long range is less common and noticeable delays may be an acceptable trade-off.

If the user strays from their recognized usage pattern, the background protocol engine 1102 adjusts the state-snapshot generation pattern during live playback without the user's knowledge. The background protocol engine 1102 moves state-snapshot positions to adjust for the new usage pattern. For example, if a user that normally seeks in small steps with the mouse wheel begins seeking longer range, the background protocol engine 1102 reduces the number of state-snapshots around the current frame to free resources for adding state-snapshots within the areas at longer range.

Figure 16:
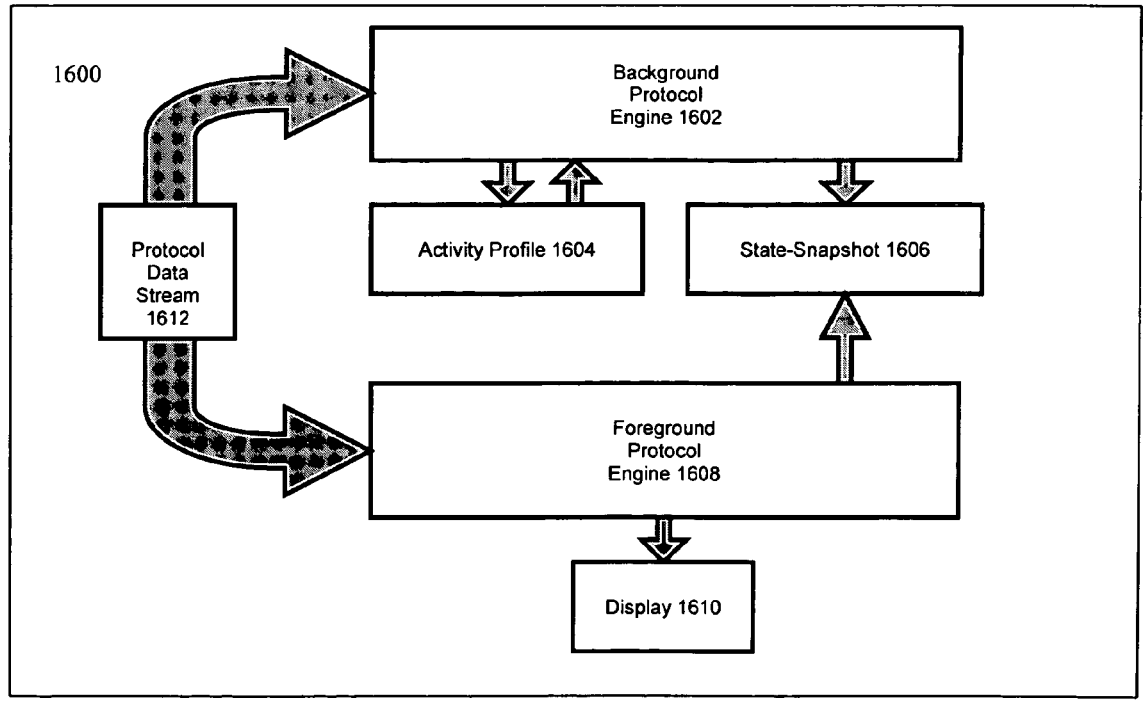
FIG. 16 is a block diagram depicting one embodiment of a system for adaptive generation of state-snapshots, including a background protocol engine, a foreground protocol engine, a protocol data stream, an activity profile, and a state-snapshot.

FIG. 16 summarizes one embodiment of the method discussed above used in a system for adaptive generation of state-snapshots, including a background protocol engine 1602, a foreground protocol engine 1608, a protocol data stream 1612, an activity profile 1604, and a state-snapshot 1606. The foreground protocol engine 1608 presents a representation of a recording of a protocol data stream to a viewer. The background protocol engine 1602 monitors an activity of the viewer during the presentation, develops an activity profile 1604 responsive to the monitoring and generates and maintains a state-snapshot 1606 responsive to the activity profile.

Figure 18:
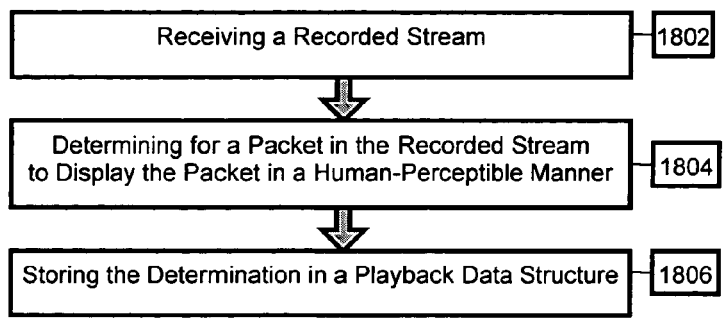
FIG. 18, a flow diagram depicts one embodiment of the steps taken to generate playback instructions for playback of a recorded computer session.

Referring ahead to FIG. 18, a flow diagram depicts one embodiment of the steps taken to generate playback instructions for playback of a recorded computer session. In brief overview, a protocol engine, executing on a first device, receives a recorded session (step 1802). The recorded stream comprises a plurality of packets representing display data generated by an application program executed on a second device. The protocol engine determines for a packet in the recorded stream, to render the contents of the packet in a human-perceptible manner (step 1804). Then the protocol engine stores the determination in a playback data structure (step 1806).

In one embodiment, the protocol engine comprises a protocol engine 502, as described in FIG. 5 above. In other embodiments, the protocol engine comprises a background protocol engine 1102, as described in FIG. 11. In still other embodiments, the protocol engine comprises a foreground protocol engine 1106, as described in FIG. 11. In some embodiments, where the protocol engine comprises a background protocol engine 1102, the protocol engine may cease performing a functionality of a background protocol engine 1102 and begin performing a functionality of a foreground protocol engine 1106. In some embodiments, where the protocol engine comprises a foreground protocol engine 1106, the protocol engine may cease performing a functionality of a foreground protocol engine 1106 and begin performing a functionality of a background protocol engine 1102. In other embodiments, the protocol engine comprises both a protocol engine 1102 and a foreground protocol engine 1006. In some of these embodiments, the background protocol engine 1102 and the foreground protocol engine 1106 reside on the same device. In other embodiments, the background protocol engine 1102 and the foreground protocol engine 1106 reside on separate devices.

In one embodiment, the protocol engine determines for a packet in the recorded stream to display the packet in a human-perceptible manner (step 1804). The display includes, without limitation, audio, visual, tactile, or olfactory presentations, or combinations of these. In some embodiments, the protocol engine determines to display a packet based responsive to the contents of the packet. In one of these embodiments, the protocol engine makes the determination responsive to an indication of an application program having input focus. In another of these embodiments, the protocol engine makes the determination responsive to an evaluation of a type of user input stored in the packet. In some of these embodiments, the protocol engine makes the determination responsive to an evaluation of a type of graphics update stored by the packet. In others of these embodiments, the protocol engine makes the determination responsive to an evaluation of a type of interaction sequence stored by the packet.

In one embodiment, the protocol engine stores the determination in a playback data structure (1806). In some embodiments, a playback data structure describes how to regenerate the display data contained within the recorded stream. In one embodiment, the instructions stored within the playback data structure control the process of rendering display data. In one embodiment, the playback data structure comprises a time for rendering the contents of a packet in the recorded stream. In this embodiment, the time contained in the playback data structure is used for rendering the contents of the packet and not a time of rendering associated with the packet in the recording, if any. In one embodiment, the playback data structure accepts user input in changing the time of rendering.

In some embodiments, the playback data structure comprises metadata that describes how to perform one or more playbacks of a recorded session. In one embodiment, the playback data structure consists of a record for each packet in the recorded stream, indicating at what relative point in time the contents of that packet should be rendered during playback. In some embodiments, the metadata also contains the offset within the file of the start of the packet.

Figure 17:
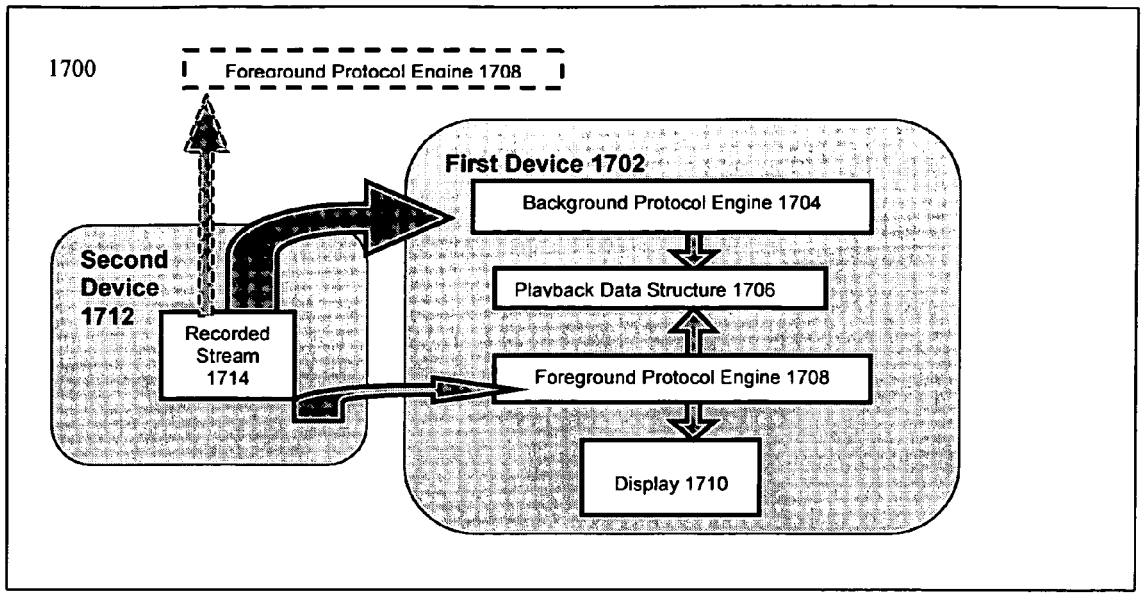
FIG. 17 is a block diagram depicting one embodiment of a system for rendering a recorded session.

Referring back to FIG. 17, a block diagram depicts one embodiment of a system for rendering a recorded session, including a first device 1702, a background protocol engine 1704, a playback data structure 1706, a foreground protocol engine 1708, a display 1710, a second device 1712, and a recorded stream 1714. The background protocol engine 1704 executes on a first device 1702 and generates a playback data structure 1706 in response to receiving a recorded stream 1714, said recorded stream 1714 representing display data generated by an application program executed on a second device 1712 or on a third device. The foreground protocol engine 1708, receives the recorded stream 1714 and renders the recorded stream 1714 responsive to the playback data structure 1706 generated by the background protocol engine 1704.

In one embodiment, the background protocol engine 1704 and the foreground protocol engine 1708 each receive the recorded stream 1714. In this embodiment, the background protocol engine 1704 generates the playback data structure substantially simultaneously with the foreground protocol engine 1708 rendering the recorded stream.

In one embodiment, the foreground protocol engine 1708 resides on the first device 1702. In another embodiment, shown in shadow in FIG. 17, the foreground protocol engine 1708 resides neither on the first device 1702 nor on the second device 1712. In still another embodiment, the foreground protocol engine 1708 resides on a third device. In some embodiments, the foreground protocol engine 1708 comprises a background protocol engine 1704. In some of these embodiments, the background protocol engine 1102 and the foreground protocol engine 1106 reside on the same device. In others of these embodiments, the background protocol engine 1102 and the foreground protocol engine 1106 reside on separate devices.

In one embodiment, the background protocol engine stores in the playback data structure at least one instruction for rendering at least one packet in the recorded stream. In another embodiment, the background protocol engine stores metadata in the playback data structure. In yet another embodiment, the background protocol engine stores in the playback data structure a record indicating a time to render at least one packet in the recorded session.

The foreground protocol engine 1708 renders at least one packet in the recorded session responsive to the playback data structure. In one embodiment, the foreground protocol engine renders at least one packet in the recorded session in a human-perceptible manner and to a buffer. In another embodiment, the foreground protocol engine renders at least one packet in the recorded session to a buffer.

Figure 19:
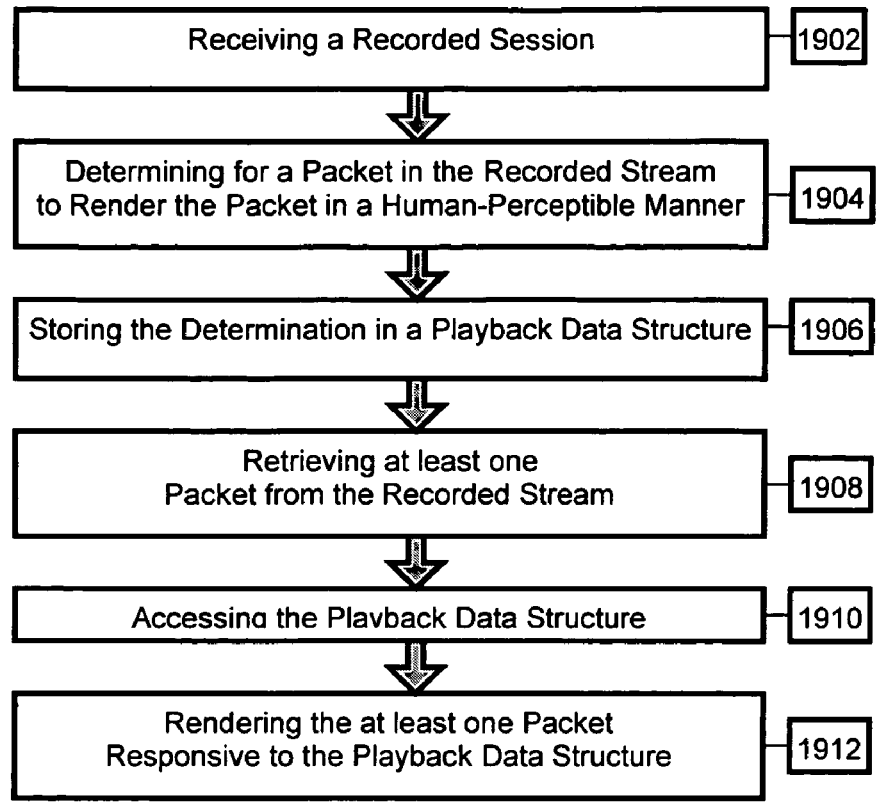
FIG. 19 is a flow diagram depicting one embodiment of the steps taken in a method for playback of a recorded computer session.

Referring ahead now to FIG. 19 a flow diagram depicts one embodiment of the steps taken in a method for playback of a recorded computer session. In brief overview, a background protocol engine receives a recorded stream comprising a plurality of packets representing display data generated by an application program executing on a second device (step 1902). The background protocol engine determines for at least one packet in the recorded stream, to render the packet in a human-perceptible manner (step 1904). The background protocol engine stores the determination in a playback data structure (step 1906). A foreground protocol engine retrieves at least one packet from the recorded stream (step 1908), access the playback data structure (step 1910), and renders the at least one packet responsive to the playback data structure (step 1912).

In one embodiment, the protocol engine determines for a packet in the recorded stream to display the packet in a human-perceptible manner (step 1904). The display includes, without limitation, audio, visual, tactile, or olfactory presentations, or combinations of these. In some embodiments, the protocol engine determines to display a packet based responsive to the contents of the packet. In one of these embodiments, the protocol engine makes the determination responsive to an indication of an application program having input focus. In another of these embodiments, the protocol engine makes the determination responsive to an evaluation of a type of user input stored in the packet. In some of these embodiments, the protocol engine makes the determination responsive to an evaluation of a type of graphics update stored by the packet. In others of these embodiments, the protocol engine makes the determination responsive to an evaluation of a type of interaction sequence stored by the packet. In one embodiment, the protocol engine stores the determination in a playback data structure (1906).

In one embodiment, the foreground protocol engine receives the recorded session. In other embodiments, the foreground protocol engine retrieves the recorded session. In some of these embodiments, the foreground protocol engine retrieves the recorded session from a storage element.

In one embodiment, the foreground protocol engine retrieves at least one packet from the recorded stream (step 1908). In this embodiment, the foreground protocol engine then accesses the playback data structure (step 1910) and renders the contents of the packet responsive to the playback data structure (step 1912). In some embodiments, the playback data structure contains an instruction to render the contents of the packet in a perceptible manner. In one of these embodiments, the foreground protocol engine renders the contents of the packet on-screen. In some embodiments, the foreground protocol engine always renders the contents of the at least one packet to a buffer. In many embodiments, when the foreground protocol engine renders the contents of a packet to a buffer, it is an off-screen buffer. In one of these embodiments, the foreground protocol engine renders the contents of the packet to an off-screen buffer and also renders the contents of the packet on-screen, as directed by the playback data structure.

In other embodiments, the playback data structure comprises an instruction not to render the contents of the packet in a perceptible manner. In one of these embodiments, upon accessing the playback data structure, the foreground protocol does not render the contents of the packet in a perceptible manner but does render the contents of the packet to a buffer.

For embodiments in which the foreground protocol engine renders the contents of a packet only to an off-screen buffer, responsive to the playback data structure, the foreground protocol engine perceptibly regenerates display data differing from the recorded stream. This results, in one embodiment, in a presentation of display data shorter than the original recorded stream. In some embodiments, the rendered contents of the packets provide a streamlined regeneration of the original display data. In other embodiments, the rendered contents of the packets provide a customized version of the display data. In one embodiment, the determination to render the contents of the packet in a perceptible manner is responsive to a policy or user request. These embodiments provide users with control over the playback of the recorded session.

Figure 21:
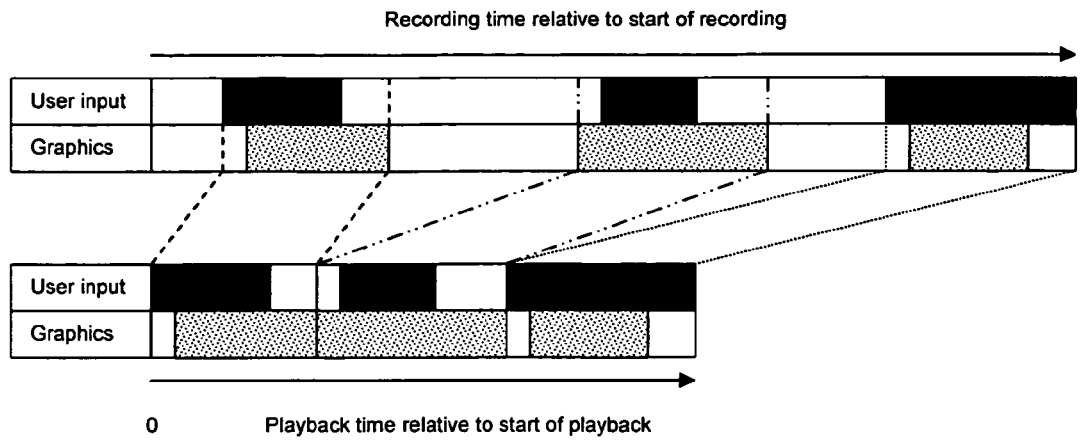
FIG. 21 depicts one embodiment of a regenerated recorded stream whose contents are rendered responsive to a playback data structure.

Referring ahead now to FIG. 21, one embodiment is depicted of rendering a recorded session with perceptible intervals of time containing no activity eliminated. In this figure, black blocks represents a packet or packets containing user input and dotted blocks represents a packet or packets containing graphics commands. The time intervals represented by white blocks in both the "User input" and "Graphics" rows have no packets and hence no activity at all.

One embodiment of a method to eliminate perceptible intervals of time with no activity is as follows. A first packet in a recorded session is identified. The recorded session comprises a plurality of packets representing display data. The nearest previous packet to the first packet in the recorded session is identified as a second packet. A first time interval is determined, the time interval occurring between said first packet and said second packet. A determination is made that the first time interval exceeds a threshold. The contents of the packets in the recorded session are rendered with a second time interval between said first packet and said second packet shorter than the first time interval.

In one embodiment, a protocol engine makes the determinations. In some embodiments, the protocol engine stores the determinations in a playback data structure. In one embodiment, the same protocol engine renders the recorded session responsive to the playback data structure. In another embodiment, the protocol engine making the determinations comprises a background protocol engine and the protocol engine rendering the recorded session comprises a foreground protocol engine.

In one embodiment, when the protocol engine determines that the time interval exceeds the threshold, the protocol engine categorizes the time interval as a perceptible time interval. A time interval is perceptible if a user of the regenerated recorded session can perceive that a period of time lacking activity has elapsed. In some embodiments, a policy determines the threshold. In other embodiments, the protocol engine is hard coded with a predefined threshold. In this embodiment, the protocol engine stores an instruction in the playback data structure to render a shorter time interval between the first and second packets instead of the original time interval. In another embodiment, the protocol engine determining that the time interval exceeds the threshold also renders the contents of the recorded session. In this embodiment, the protocol engine does not store the instruction to render the shorter time interval in the playback data structure. For a time interval not categorized as perceptible, no shortened time interval is needed and the original time interval is rendered between the first and second packets.

Figure 20:
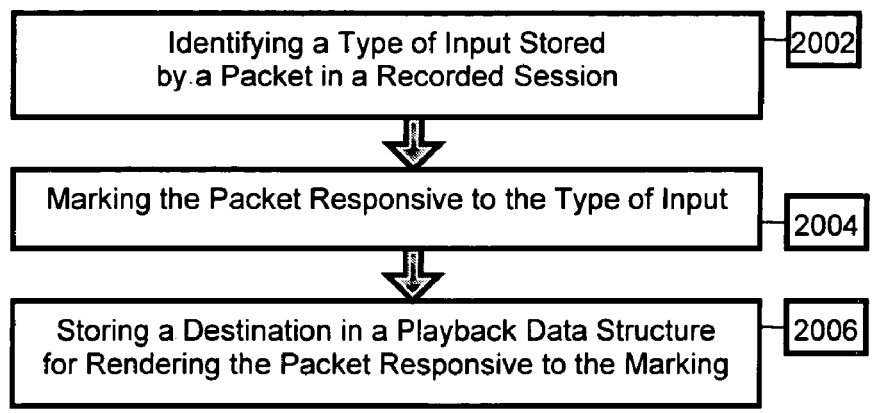
FIG. 20 is a flow diagram depicting one embodiment of the steps taken to generate playback instructions for rendering a recorded session.

Referring back to FIG. 20, a flow diagram depicts one embodiment of the steps taken to generate playback instructions for rendering a recorded session. In brief overview, a type of input stored by a packet in a recorded session is identified (step 2002) and the packet is marked responsive to the type of input (step 2004). Then a destination for rendering the contents of the packet, responsive to the marking, is stored in a playback data structure.

In one embodiment, the type of input stored by a packet determines whether or not the packet will be rendered. In one embodiment, the packet contains no content. In some embodiments, at least one packet contains no content. In these embodiments, an interval of time comprised of at least one packet containing no content is identified. In some of these embodiments, the interval of time will not be rendered.

In some embodiments, the type of input refers to input from certain types of input devices, including, without limitation, a keyboard, a mouse, a microphone, or a camera. In one embodiment the step of identifying the type of input further comprises identifying the type of input as input from an input device. In another embodiment, the step of identifying the type of input further comprises identifying the type of input as keyboard input. In other embodiments, the type of input is not related to the input device. In one of these embodiments, the type of input is identified as a command.

The packet containing the input is marked responsive to the type of input it contains (step 2004). In one embodiment, the packet is marked responsive to a policy. In this embodiment, a policy determines the types of input which result in a packet being marked. In another embodiment, no marking is required.

A destination for rendering the packet is stored in a playback data structure responsive to the marking (step 2006). In some embodiments, the destination comprises a buffer. In one embodiment, an instruction is stored in the playback data structure, directing rendering of the packet to the buffer. In one embodiment, the buffer is an off-screen buffer and when the contents of the packet are rendered to the buffer they are not perceptible to a user of the rendering. In one embodiment, an instruction is stored in the playback data structure, directing rendering of the marked packet both in a perceptible manner and to a buffer.

In one embodiment, the method eliminates perceptible intervals of time containing no meaningful activity. In this embodiment, a policy identifies a particular type of input as meaningful or as insignificant. The policy may be hard coded into a protocol engine, in some embodiments. In other embodiments, an administrator configures the policy.

Figure 22:
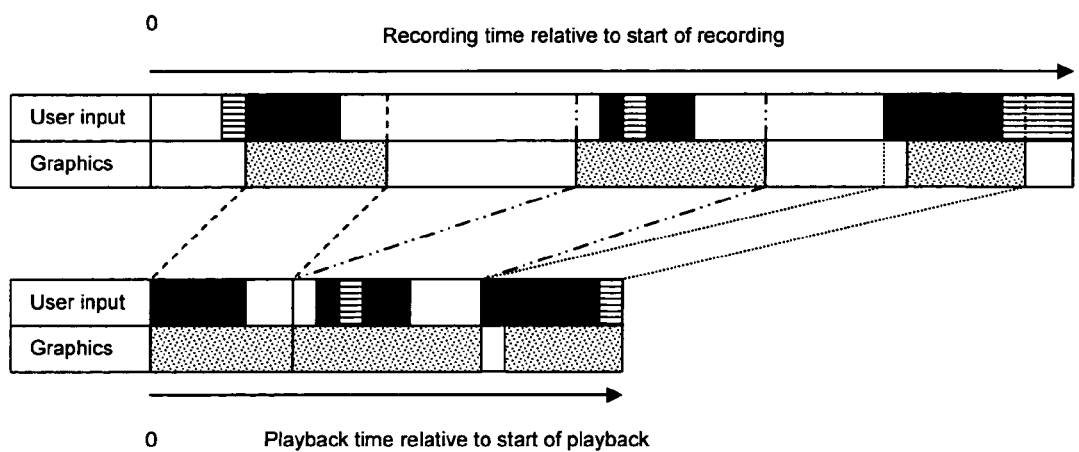
FIG. 22 depicts one embodiment of certain packets in a recording stream having content representing meaningful user activity, in this embodiment a mouse input indicating an active mouse button state.

In some embodiments, a protocol engine identifies a packet as insignificant if the packet contains no content. In some of those embodiments, the packet represents an interval of time in which the no user activity occurred to be recorded into the recorded stream 1714. In these embodiments, the protocol engine stores in a playback data structure a destination for rendering each of the plurality of packets in the recorded stream in such a way that any insignificant packet does not render in a perceptible manner. FIG. 22 depicts one embodiment of a regenerated recorded stream whose contents are rendered responsive to a playback data structure. Rendering responsive to the playback data structure, in this embodiment, allows elimination of intervals of time containing no meaningful activity (depicted by the white and striped blocks in FIG. 22), which includes intervals of time containing no activity at all. This rendering provides a more meaningful regeneration of the recorded session to a user, where a policy determines when content represents meaningful activity. In one embodiment, the content representing meaningful activity comprises types of user input.

In some embodiments, the protocol engine identifies an input type responsive to previously defined input types comprising provably insignificant time. In some embodiments, insignificant time includes an interval of time in which no packet contains any content. In other embodiments, a policy defines the input types, which constitute insignificant time. In still other embodiments, a definition of an input type comprising provably insignificant time is hard coded into the protocol engine.

In some embodiments, the contents of a packet represent user activity but a policy identified the activity as insignificant activity. In one of these embodiments, the policy defines an insignificant activity as activity deemed to be of no interest to a user of the regenerated recorded session. In another of these embodiments, meaningful packets contain contents of interest to a user of the regenerated recorded session, as determined by the policy. In one embodiment, an insignificant packet has no content representing input meaningfully interacting with an application. In another embodiment, the device transmitting application data in the protocol data stream from which the recorded stream was created transmitted no meaningful screen updates.

In one embodiment, the protocol engine determines for at least one packet in the recorded session whether the contents of the packet include types of input such as, without limitation, keyboard input, mouse input, or command messages. If the packet does contain a type of input such as keyboard input, the protocol engine marks the packet as a meaningful packet. If the packet does not contain that type of input, the protocol engine marks the packet as insignificant. In one embodiment, the packet is insignificant only if all of its contents are insignificant. In another embodiment, a packet contains more than one type of input each of which may be marked as meaningful or insignificant.

In one embodiment, when the protocol engine marks a packet as insignificant, the protocol engine determines that the contents of the packet should not render in a perceptible manner. In some embodiments, the protocol engine determines instead that the contents of the packet should render to a buffer. In one of these embodiments, the buffer is an off-screen buffer. If the packet is marked as a meaningful packet, the protocol engine determines, in one embodiment, that the contents of the packet should render in a perceptible manner. In some embodiments, a perceptible manner comprises rendering on-screen. In one embodiment, the protocol engine determines that the packet should render both in a perceptible manner and to a buffer. In this embodiment, the contents of the packet render both to an on-screen display and to an off-screen buffer. The protocol engine stores the determination in the playback data structure.

In one embodiment, depicted in FIG. 22, certain packets in the recording stream have content representing meaningful user activity, in this embodiment a mouse input indicating an active mouse button state represented by the black blocks in FIG. 22. Other packets in the recording stream have content representing mouse input indicating an inactive mouse button state, represented by the striped blocks in FIG. 22. The protocol engine identifies at least one packet containing only insignificant activity, such as a mouse input indicating an inactive mouse button state, and stores in a playback data structure a determination that the contents of the packet should not render in a perceptible manner. By making this determination, a protocol engine rendering the contents of the recorded stream responsive to the playback data structure regenerates only the display data relevant to the user of the regenerated recorded session, where a policy defines relevance or where the protocol engine comprises a definition of relevant content.

Figure 23:
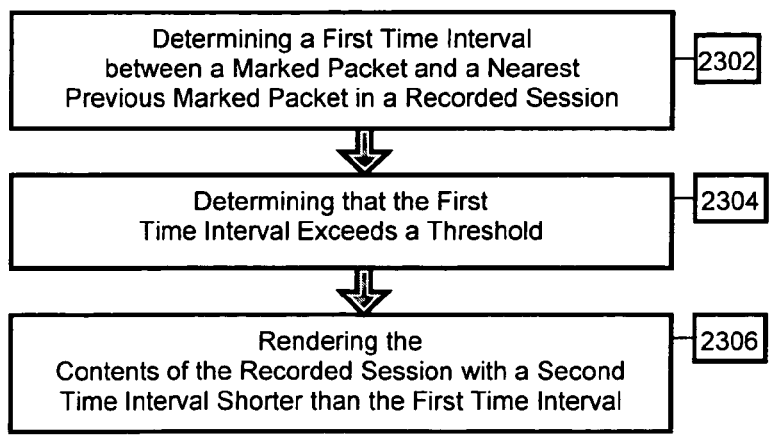
FIG. 23 is a flow diagram depicting one embodiment of the steps taken to eliminate periods with no meaningful activity in rendering a recorded session.

Referring now to FIG. 23, a flow diagram depicts one embodiment of the steps taken to eliminate periods with no meaningful activity in rendering a recorded session. A first time interval is determined, the time interval occurring between a marked packet and a nearest previous marked packet in a recorded session (step 2302). The recorded session comprises a plurality of packets representing display data. A determination is made that the first time interval exceeds a threshold (step 2304). The contents of the packets in the recorded session are rendered with a second time interval between the marked packet and the nearest previous marked packet shorter than the first time interval (step 2306).

In one embodiment, a protocol engine makes the determinations. In some embodiments, the protocol engine stores the determinations in a playback data structure. In one embodiment, the same protocol engine renders the recorded session responsive to the playback data structure. In another embodiment, the protocol engine making the determinations comprises a background protocol engine and the protocol engine rendering the recorded session comprises a foreground protocol engine.

In some embodiments, the protocol engine makes the determination of the first time interval (step 2302) and whether or not the first time interval exceeds a threshold (step 2304) after a packet has been marked as a meaningful packet responsive to the type of input contained in the packet. In one of these embodiments, the type of output contained in the packet impacts the determination to mark the packet. In one embodiment, the protocol engine determines the time interval between the packet marked as meaningful and the nearest previous meaningful packet, or the start of the recording if there are no previous meaningful packets. In another embodiment, the protocol engine renders the contents of the recorded session with a second time interval between the marked packet and a previous packet said second time interval comprising a shorter time interval than the first time interval. In another embodiment, the protocol engine renders the contents of the recorded session with a second time interval between the marked packet and a packet following the marked packet, said second time interval comprising a shorter time interval than the first time interval.

In one embodiment, when the protocol engine determines that the time interval exceeds the threshold (step 2304), the protocol engine categorizes the time interval as a perceptible time interval. A time interval is perceptible if a user of the regenerated recorded session can perceive that a period of time lacking activity has elapsed. In some embodiments, a policy determines the threshold. In other embodiments, the protocol engine is hard coded with a predefined threshold. In this embodiment, the protocol engine stores an instruction in the playback data structure to render a shorter time interval between the two meaningful packets instead of the original time interval. In another embodiment, the protocol engine determining that the time interval exceeds the threshold also renders the contents of the recorded session. In this embodiment, the protocol engine does not store the instruction to render the shorter time interval in the playback data structure. For a time interval not categorized as perceptible, no shortened time interval is needed and the original time interval is rendered between the two meaningful packets.

In some embodiments, contents of a packet in the recorded stream represent graphics updates affecting a screen region. In one embodiment, the graphics updates include, without limitation, flashing system tray icons, title bars or task bar entries, blinking text in web pages or applications, clock displays, system animations, application animations, and stock tickers and other periodically updated information displays. In some embodiments, graphics updates such as these are determined to be insignificant to a user of a regeneration of the recorded stream. In one of these embodiments, a protocol engine comprises this determination. In another of these embodiments, a policy defines at least one graphics update as insignificant.

In this embodiment, an administrator generates the policy. In another embodiment, a user of the regeneration of the recorded stream generates the policy.

Figure 24:
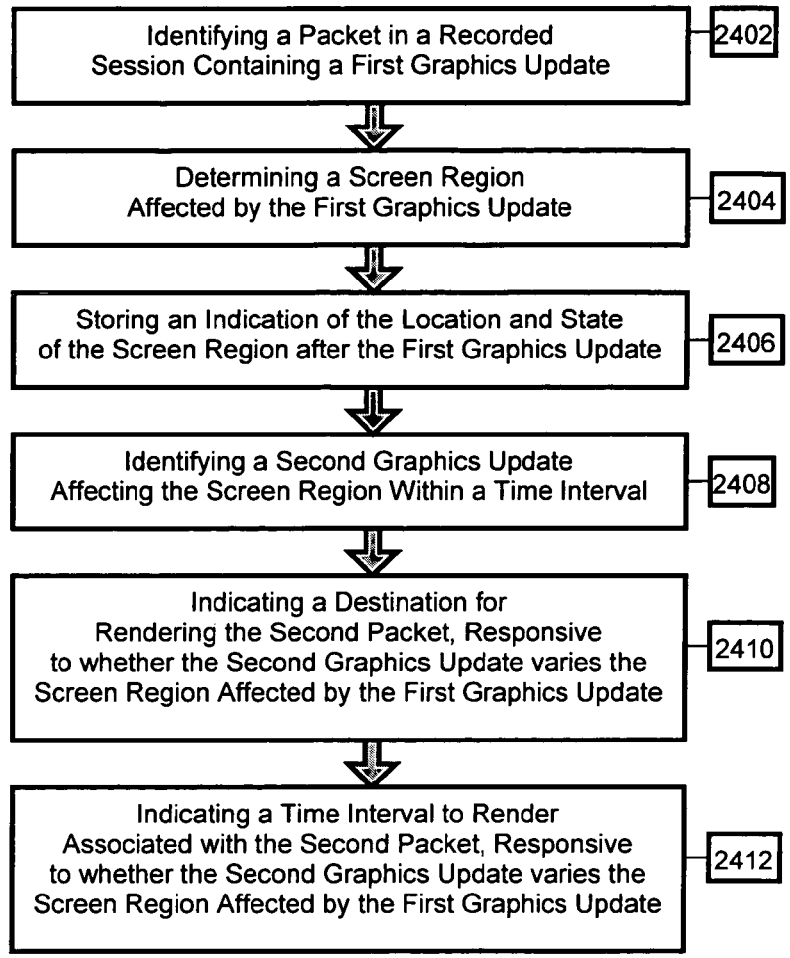
FIG. 24 is a flow diagram depicting one embodiment of the steps taken to eliminate a graphics update in rendering a recorded session.

Referring now to FIG. 24, a flow diagram depicts one embodiment of the steps taken to eliminate a graphics update in rendering a recorded session. In brief overview, a graphics update is identified (step 2402) and the screen region affected by the graphics update is determined (step 2404). An indication of the location and state of the affected screen region is stored (step 2406) and a second graphics update affecting the state of the screen region is identified (step 2408). Then a destination for rendering and a time interval for rendering are indicated, responsive to whether the second graphics update varies the region affected by the first graphics update (step 2410 and step 2412).

In one embodiment, a protocol engine performs the steps depicted by FIG. 24. In this embodiment, the protocol engine identifies a packet in a recorded session, said recorded session representing display data generated by an application program and said packet containing a first graphics update.

The protocol engine determines a screen region affected by the first graphics update. In one embodiment, the graphics update affects a screen region by changing the data displayed on that portion of the screen. The protocol engine stores an indication of the state of the screen region after the first graphics update and the location of the screen region. In one embodiment, the protocol engine stores a copy of the updated screen region. In another embodiment, the protocol engine stores a hash of the updated screen region.

In one embodiment, the protocol engine identifies a second graphics update affecting the screen region within a time interval. In some embodiments, a policy determines the length of the time interval. In one of these embodiments, the policy determines a time interval approximating the upper limit of human scale cyclic periods used by applications and operating systems. In one embodiment, when a region of the screen goes through a cyclic display, at a period designed to be viewed by the user (for example, a significant fraction of a second up to several seconds), the display comprises a human scale cyclic period. In some embodiments, the protocol engine comprises a definition of the length of the time interval.

In an embodiment where the protocol engine identifies a second graphics update affecting the screen region affected by the first graphics update, the protocol engine determines whether the state of the screen region after the second graphics update varies from the state of the screen region after the first graphics update. If the screen region does not vary after the second graphics update, the second graphics update need not render in the regenerated recorded session. A screen graphics update in this embodiment need not render since the protocol engine determined that the graphics update is performing a cycle of drawing commands at human-scale speeds, making the update observable to a user of the regenerated recorded session, but the graphics update carries insignificant information for the user. In some embodiments, the graphics update affects the screen region by drawing, without limitation, a caret flashing, a flashing taskbar icon, a network activity indicator, or scrolling text. In some embodiments, a policy determines that affecting a screen region with that type of graphics update does not constitute a meaningful activity and should not render in the regeneration of the recorded session for a user. In other embodiments, the protocol engine comprises this determination.

In one embodiment, an indication of a destination for rendering the second packet containing the second graphic update affecting the screen region is stored in a playback data structure, responsive to whether the screen region varies after the second graphics update. In another embodiment, an indication of a time interval to render associated with the second packet containing the second graphic update affecting the screen region is stored in a playback data structure, responsive to whether the state of the screen region after the second graphics update varies from the state of the screen region after the first graphics update.

Figure 25:
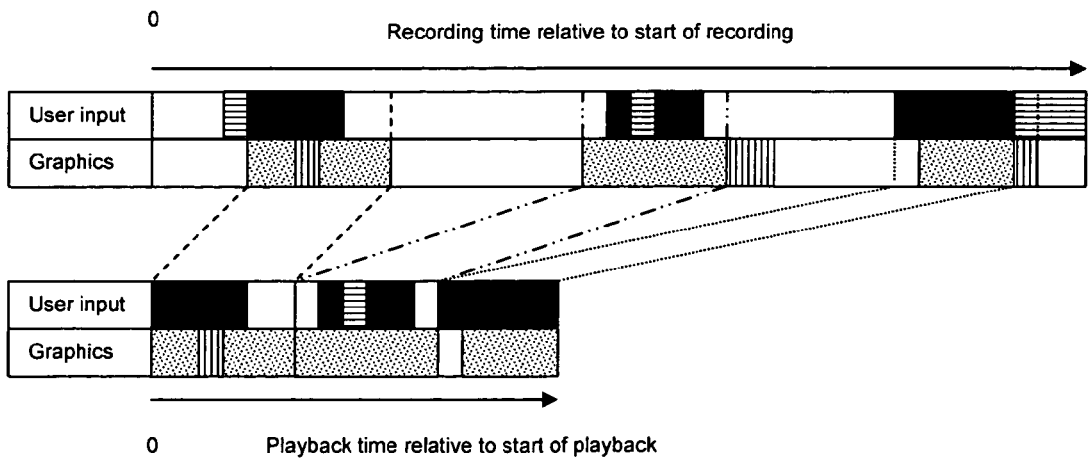
FIG. 25 depicts one embodiment of rendering a regenerated recorded session responsive to whether the state of the screen region after a second graphics update varies from the state of the screen region after a first graphics update.

FIG. 25 depicts one embodiment of rendering the regenerated recorded session responsive to indications stored in a playback data structure, responsive to whether the state of the screen region after the second graphics update varies from the state of the screen region after the first graphics update. In one embodiment, the screen region affected by the first graphics update does not vary after the second graphics update. In this embodiment, an indication is stored in a playback data structure not to render the second graphics update in a perceptible manner. In one embodiment, not perceptibly rendering the second graphics update comprises rendering the second graphics update off-screen and not on-screen. In some embodiments, not perceptibly rendering the second graphics update comprises rendering the second graphics update to an off-screen buffer. In one embodiment, not perceptibly rendering the second graphics update comprises not rendering the second graphics update. In some embodiments, a determination not to render the second graphics update perceptibly comprises rendering a perceptible indication that the graphics update is not rendered. In one of these embodiments, a user of the regenerated recorded session may request that the second graphics update render perceptibly.

FIG. 25 depicts an embodiment in which a cyclic update is detected by determining that the state of the screen region after the second graphics update does not vary from the state of the screen region after the first graphics update and determining not to render the second graphics update responsive to the detection of the cyclic update. In one embodiment where the state of the screen region affected by the second graphics update varies from the state of the screen region after the first graphics update, a determination is made to render the contents of the packet in a perceptible manner and to a buffer.

In some embodiments, the contents of a plurality of packets represent a graphics update. In one of these embodiments, a determination to render a graphics update in a perceptible manner is made responsive to the effects of more than two graphics updates on a screen region. In one embodiment, the determination of a destination for rendering a graphics update is responsive to the graphics update represented by the contents of each packet in the identified plurality of packets.

In some embodiments, contents of a packet in the recorded stream represent an interaction sequence. In one embodiment, the interaction sequence comprises, without limitation, a logon sequence, a logoff sequence, or the entering of credentials. In some embodiments, interaction sequences such as these are determined to be insignificant to a user of a regeneration of the recorded stream. In one of these embodiments, a protocol engine comprises this determination. In another of these embodiments, a policy defines at least one interaction sequence as insignificant. In this embodiment, an administrator generates the policy. In another embodiment, a user of the regeneration of the recorded stream generates the policy.

Figure 26:
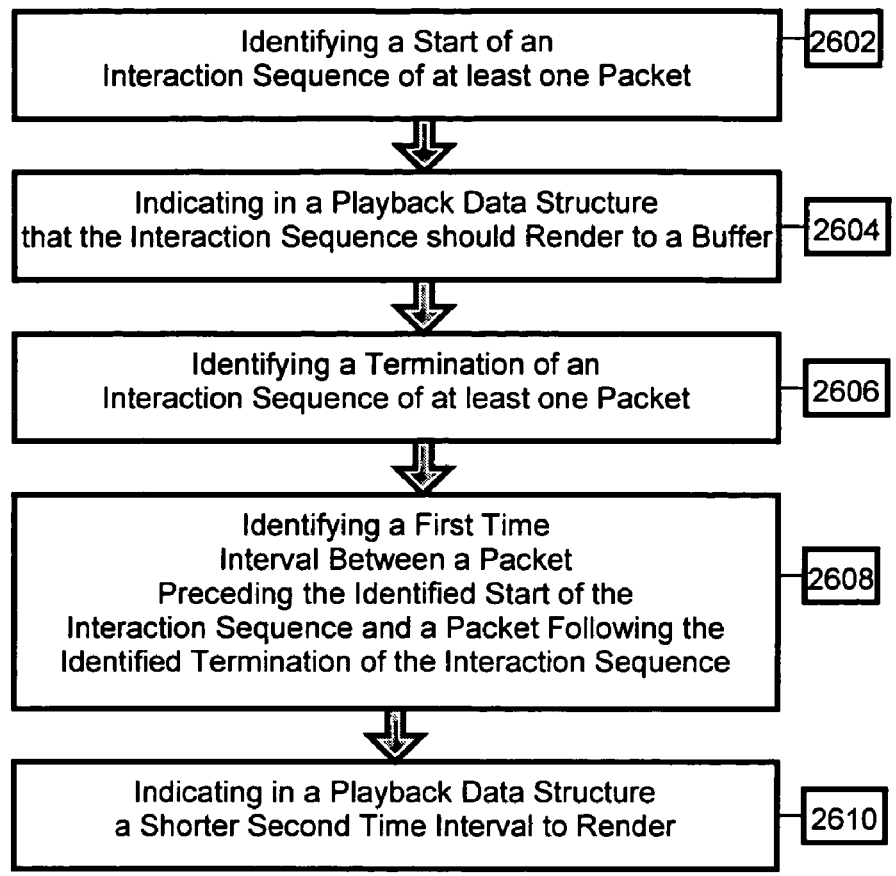
FIG. 26 is a flow diagram depicting one embodiment of the steps taken to eliminate interaction sequences in rendering a recorded session.

Referring now to FIG. 26, a flow diagram depicts one embodiment of the steps taken to eliminate interaction sequences in rendering a recorded session. A start of an interaction sequence of at least one packet is identified responsive to a policy (step 2602). In a playback data structure there is an indication that the interaction sequence should render to a buffer (step 2604). A termination of the interaction sequence of at least one packet is identified (step 2606). A first time interval between a packet preceding the identified start of the interaction sequence and a packet following the identified termination of the interaction sequence is identified (step 2608). A playback data structure contains an indication to render a second time interval shorter than the first time interval (step 2610).

In one embodiment, a protocol engine makes the identifications and indications to eliminate an interaction sequence. An identification of a start of an interaction sequence is made (step 2602). In one embodiment, the start of the interaction sequence is identified by identifying a visual marker. In one embodiment, a visual marker comprises a credentials window, displayed in the same way for all sessions. In another embodiment, a visual marker comprises a replacement of a credentials window by a blank screen and then by a desktop background. In one embodiment, a visual marker comprises the display of recognizable icons.

In some embodiments, a start of an interaction sequence is identified by determining a start time of an interaction sequence. In one of these embodiments, a component detects the start time of an event in an interaction sequence. In another of these embodiments, the component detects the start time of a logon sequence. In still others of these embodiments, the component detects the start time of a logoff sequence. In one embodiment, the identification of the start of the interaction sequence is responsive to identifying a window with an input focus.

An indication is made in a playback data structure that an interaction sequence should render in a buffer (step 2604). In this embodiment, where an identified interaction sequence should not render perceptibly, the interaction sequence is rendered to a buffer. Rendering the interaction sequence to a buffer results in the interaction sequence being imperceptible to a user of the rendering. For embodiments where a policy or user categorized the interaction sequence as insignificant, this rendering results in the elimination of an insignificant interaction sequence.

An identification of a termination of an interaction sequence is also made (step 2606). In some embodiments, the termination of the interaction sequence is identified by identifying a visual marker. In other embodiments, a termination of an interaction sequence is identified by determining a termination time of the interaction sequence. In one of these embodiments, a component detects the termination time of an event in an interaction sequence. In another of these embodiments, the component detects the termination time of a logon sequence. In still others of these embodiments, the component detects the termination time of a logoff sequence. In another embodiment, identifying the termination of the interaction sequence is responsive to identifying a window with an input focus.

In some embodiments, an interaction sequence comprises use of an application. In one of these embodiments, a policy identifies interaction sequences comprising use of an application that should not render in a perceptible manner. In one embodiment, such applications include, without limitation, word processing documents.

In one of these embodiments, a start of an interaction sequence is identified by identifying an application having input focus. When the contents of a packet represent a window having focus, a determination is made as to the application responsible for the process that created the window. In one embodiment, the contents of the packet representing a window having focus include window notification messages indicating a change in input focus. If the responsible application identifies a start of an interaction sequence which should not render perceptibly, an indication is stored in a playback data structure to render the interaction sequence to a buffer. A termination of an interaction sequence is identified by identifying the acquisition of focus by a window owned by a process not associated with the application of the interaction sequence.

In one embodiment, a first time interval is associated with the interaction sequence. Perceptibly rendering the time interval associated with the interaction sequence in an embodiment where the interaction sequence itself does not render results in a period of time perceptible to a user of the rendering in which no display data renders and the user waits through the time interval before a rendering of the contents of a packet after the interaction sequence. One embodiment eliminates the time interval associated with the interaction sequence by rendering a shorter time interval in place of the original time interval. In this embodiment, a first time interval between a packet preceding the identified start of the interaction sequence and a packet following the identified termination of the interaction sequence is identified (step 2608). A playback data structure contains an indication to render a second time interval shorter than the first time interval (step 2610).

In some embodiments, a protocol engine renders the contents of a packet in a recorded session, providing to a user a regeneration of the recorded session. In some of these embodiments, the protocol engine automatically varies the time intervals between rendering the contents of at least one packet, resulting in context-sensitive time-warped playback. In these embodiments, rendering approximates the ability of the user to comprehend the display data presented to the user. In one embodiment, the time intervals between rendering contents of packets increase when the protocol engine determines the display data represented by the contents of the packets to have an increased level of complexity or importance, as defined by a policy. In another embodiment, the time intervals between rendering contents of packets decrease when the protocol engine determines the display data represented by the contents of the packets to have a decreased level of complexity or importance, as defined by a policy. In these embodiments, the protocol engine approximates the ability of the user to comprehend the display data and renders the contents either more slowly to give the user time to comprehend the rendering or renders the contents faster when a user requires less comprehension time.

Figure 27:
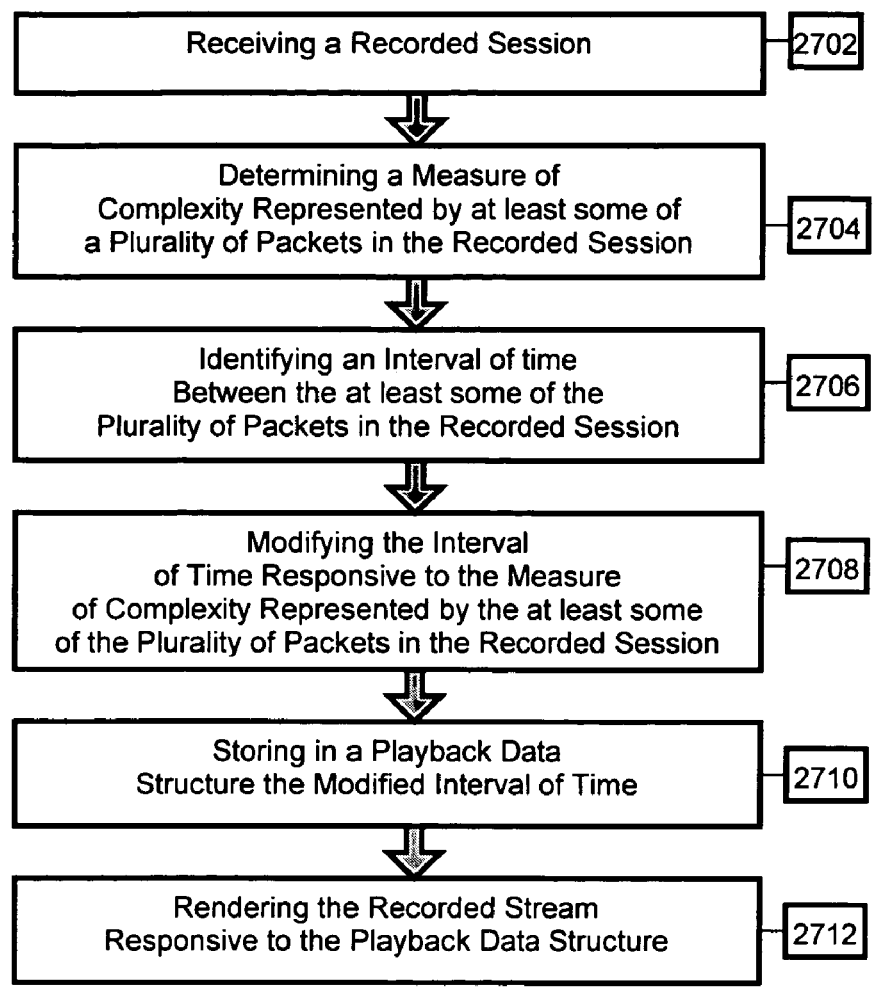
FIG. 27 is a flow diagram depicting one embodiment of the steps taken in automatic time-warped playback in rendering a recorded computer session.

Referring now to FIG. 27, a flow diagram depicts one embodiment of the steps taken in automatic time-warped playback in rendering a recorded computer session. A protocol engine receives a recorded session (step 2702), the recorded session comprising a plurality of packets and representing display data, and the protocol engine determining a measure of complexity represented by at least some of the plurality of packets in the recorded session (step 2704). The protocol engine identifies an interval of time between the at least some of the plurality of packets in the recorded session (step 2706) and modifies the interval of time responsive to the measure of complexity represented by the at least some of the plurality of packets in the recorded session (step 2708). The protocol engine stores in a playback data structure the modified interval of time (step 2710) and the recorded data stream is rendered responsive to the playback data structure (step 2712).

In some embodiments, the protocol engine determining the measure of complexity, identifying the interval of time, modifying the interval of time and storing the modification is a background protocol engine. In one of these embodiments, the background protocol engine also renders the recorded stream. In another of these embodiments, a foreground protocol engine renders the recorded stream responsive to the playback data structure. In some embodiments, the background protocol engine and the foreground protocol engine reside on the same device. In other embodiments, the background protocol engine and the foreground protocol engine reside on separate devices.

In some embodiments, the protocol engine determines a measure of complexity represented by at least some of a plurality of packets in the recorded session (step 2704). In some of these embodiments, the protocol engine determines the measure of complexity by identifying likely sequences of typing in keyboard input. In one embodiment, the protocol engine inspects at least one type of key involved to identify likely sequences of typing in keyboard input. In another embodiment, the protocol engine inspects a sequence of at least one glyph rendered to complete a heuristic approximation of likely sequences of typing in keyboard input.

In some of these embodiments, the protocol engine stores classifications of keys determined by characteristics of the key. Key characteristics include, without limitation printable or non-printable characters, white space, navigation keys, or function keys, and include combinations of characteristics. In one embodiment, a protocol engine determines that sections of input comprising printable characters and occasional navigation keys constitute normal typing, while sections with mostly non-visible keys do not constitute normal typing in one embodiment, the protocol engine determines a measure of complexity responsive to the amount of white space identified. In this embodiment, the protocol engine comprises a definition of word processing indicating that a white space key appears on average approximately every 5-8 characters in typical typing patterns.

In one embodiment, the protocol engine uses the appearance of non-printable characters to determine the measure of complexity. In another embodiment, the protocol engine accesses the keystroke sequences to identify sequences of non-white space printable characters appearing close together in time. In this embodiment, the protocol engine comprises the capacity to compare the keystroke sequences to a dictionary to identify valid words and determine a measure of complexity relating to an ability of a user to comprehend valid words versus invalid words.

In another embodiment, the protocol engine determines that the contents of the packet contain commands to render glyphs. In this embodiment, the protocol engine uses the glyphs to determine whether the display data represents a user activity of typing. In this embodiment, if a glyph rendering rate approximates the keyboard input rate with a small delay, it is likely that keystrokes are directly resulting in glyphs, thus making it quite likely the user is typing. In one embodiment, the protocol engine correlates the keys entered with the glyphs produced. In another embodiment, the protocol engine determines the spatial sequence (left-to-right, right-to-left, etc.) of the rendered glyphs to determine that a user is typing. In one embodiment, the protocol engine makes the determination of the measure of complexity responsive to the result of analyzing the contents of the plurality of packets and identifying patterns and activities represented by the contents.

In other embodiments, the protocol engine makes the determination of the measure of complexity responsive to an identification of a type of mouse input. In one embodiment, the protocol engine determines that a mouse input representing a click of the mouse causes actions that may need a slower rendering rate to comprehend, especially if the clicks follow a sequence of typing. In another embodiment, the protocol engine determines that mouse input that does not represent a clicking of a mouse does not affect the ability of a user to comprehend display data, and thus does not affect the measure of complexity.

In other embodiments, the protocol engine makes the determination of the measure of complexity responsive to identifying a heuristic approximation of complexity of a graphics update. In one embodiment, the protocol engine identifies a heuristic approximation of complexity of a graphics update based upon, without limitation, the size of region(s) being updated, the size of the area of the region changed by the graphics commands, a historical frequency of updates to individual regions, cyclic graphics commands, number of graphics commands, frequency of graphics commands, time interval between adjacent packets whose contents contain graphics command, or the type of graphics update. In an embodiment where the protocol engine identifies a low measure of complexity for the graphics update, the protocol engine determines a low measure of complexity represented by the packets containing the graphics updates. In an embodiment where the protocol engine identifies a high measure of complexity for the graphics update, the protocol engine determines a high measure of complexity represented by the packets containing the graphics updates.

In one embodiment, the protocol engine identifies an interval of time between the at least some of the plurality of packets in the recorded session (step 2706). In this embodiment, the protocol engine modifies the interval of time responsive to the determined measure of complexity (step 2708). In an embodiment where at least some of the plurality of packets in the recorded session have content representing display data associated with a high measure of complexity, the protocol engine increases the interval of time between the packets to allow the user of the rendering increased time to comprehend the rendered display data. In another embodiment where at least some of the plurality of packets in the recorded session have content representing display data associated with a low measure of complexity, the protocol engine decreases the interval of time between the packets to reflect decreased amount of time the user requires to comprehend the rendered display data. In one embodiment, a user requires a different amount of time between the rendered contents of packets than the amount rendered by the protocol engine. In this embodiment, the user modifies the interval of time to reflect the amount of time the user requires to comprehend the rendered display data. In some embodiments, the protocol engine also identifies a time interval between the at least some of the plurality of packets and other packets in the plurality of packets, modifying the interval of time identified between those sets of packets.

In some embodiments, the protocol engine identifies a first marker associated with a packet in the recorded session. In one embodiment, the packet comprises the marker. In another embodiment, the recorded session comprises the marker.

In one embodiment, a user of the rendering of the display data defines the marker. In another embodiment, the protocol engine defines the marker. In embodiments where the protocol engine identifies a marker, the protocol engine modifies the interval of time responsive to the first marker. In one embodiment, the protocol engine increases the interval of time providing the user of the rendering of the display data additional time for comprehending the contents of the packet associated with the first marker. In other embodiments, the protocol engine identifies a second marker in a second packet. In this embodiment, the protocol engine modifies the interval of time responsive to the distance between the first marker and the second marker. In this embodiment, the protocol engine provides increased time for comprehension of display data represented by contents of packets marked and decreased time for comprehension of data represented by contents of unmarked packets. In one embodiment, a user defines markers for display data of interest to the user and the protocol engine renders additional time for the display data of interest to the user and decreases time of rendering for display data not of interest to the user, as determined by the markers.

In one embodiment, the protocol engine identifies a first marker in the at least some of the plurality of packets in the recorded session, said marker indicating an initial packet in the at least some of the plurality of packets in the recorded session. The protocol engine modifies the interval of time responsive to the first marker. The protocol engine identifies a second marker in a second packet in the at least some of the plurality of packets in the recorded session, said second marker indicating a final packet in the at least some of the plurality of packets in the recorded session and modifying the interval of time responsive to the interval of time between the first marker and the second marker.

In one embodiment, the protocol engine stores the modified interval of time in a playback data structure (step 2710) and the recorded stream is rendered responsive to the contents of the playback data structure (step 2712). In one embodiment, the protocol engine also renders the recorded stream responsive to the playback data structure instructions regarding modified time intervals. In another embodiment, a separate foreground protocol engine renders the recorded stream.

In some embodiments, a determination is made that recorded interaction with an application requires increased time for rendering, to provide a user of the rendering increased time for comprehension of the rendered display data. In some of these embodiments, the determination is made that the application requiring increased time comprises a more important application than an application not requiring the increased time. In one of these embodiments, the user makes the determination. In another of these embodiments, a policy makes the determination. In still another of these embodiments, the protocol engine comprises a definition of applications that require increased time.

Figure 28:
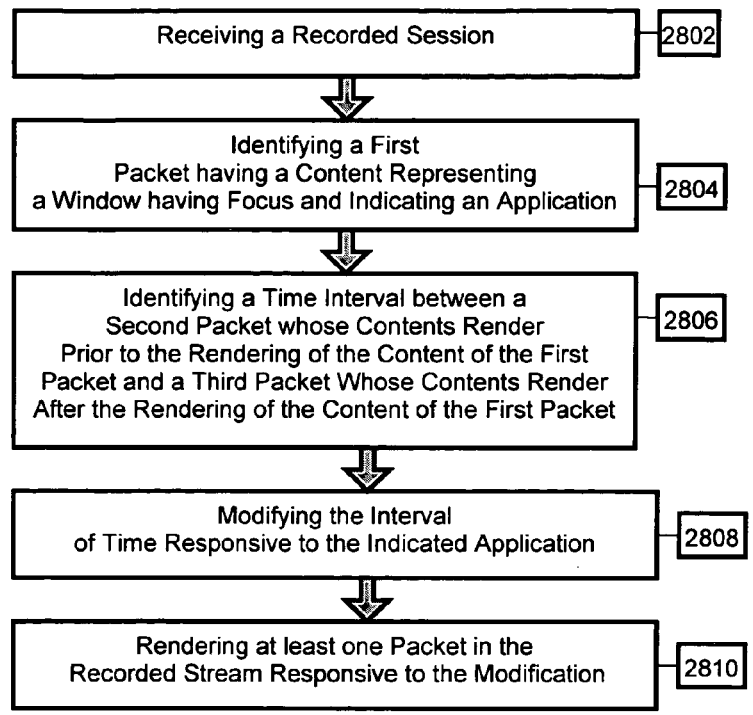
FIG. 28 is a flow diagram depicting one embodiment of the steps taken for automatic time-warped playback responsive to an identified application in rendering a recorded computer session.

Referring now to FIG. 28, a flow diagram depicts one embodiment of the steps taken for automatic time-warped playback responsive to an identified application in rendering a recorded computer session. A recorded session comprising a plurality of packets and representing display data is received (step 2802). A first packet having a content representing a window having focus is identified, said window indicating an application (step 2804). A time interval is identified between a second packet whose contents render prior to the rendering of the content of the first packet and a third packet whose contents render after the rendering of the content of the first packet (step 2806). The identified time interval is modified responsive to the indicated application (step 2808). At least one packet in the recorded stream is rendered responsive to the modification (step 2810).

In one embodiment, a protocol engine receives the recorded session (step 2802). In this embodiment, the protocol engine also identifies a first packet having a content representing a window having focus is identified, said window indicating an application (step 2804). In one embodiment, the contents of the packet representing a window having focus include window notification messages indicating a change in input focus. In one embodiment, a time interval is identified between a second packet whose contents render prior to the rendering of the content of the first packet and a third packet whose contents render after the rendering of the content of the first packet (step 2806). In this embodiment, the protocol engine identifies a packet whose contents render prior to the rendering of content representing an application window having focus, a packet whose contents represent the application window having focus, and a packet whose contents represent the application window no longer having focus.

In some embodiments, the protocol engine modifies the time interval preceding the application having focus. In other embodiments, the protocol engine modifies the time interval following the application having focus. In one embodiment, the protocol engine then determines the interval of time in which the application window has focus and modifies that time interval responsive to the type of application. In one embodiment, the protocol engine increases the identified time interval. In this embodiment, the protocol engine provides the user of the rendering an increased amount of time to review the application. In another embodiment, the protocol engine decreases the identified time interval. In this embodiment, the protocol engine provides the user of the rendering a decreased amount of time to review the application, reflecting the decreased amount of interest in the application.

In one embodiment, the protocol engine renders at least one packet in the recorded stream responsive to the modification. In one embodiment, the protocol engine renders the contents of the at least one packet in the recorded stream to a buffer. In one embodiment, rendering to a buffer does not render the contents of the packet in a perceptible manner. In another embodiment, the protocol engine renders the contents of the at least one packet in the recorded stream to a buffer and in a perceptible manner. In some embodiments, the protocol engine indicates the modified time interval in a playback data structure and a separate protocol engine renders the recorded session responsive to the information stored in the playback data structure.

Figure 29:
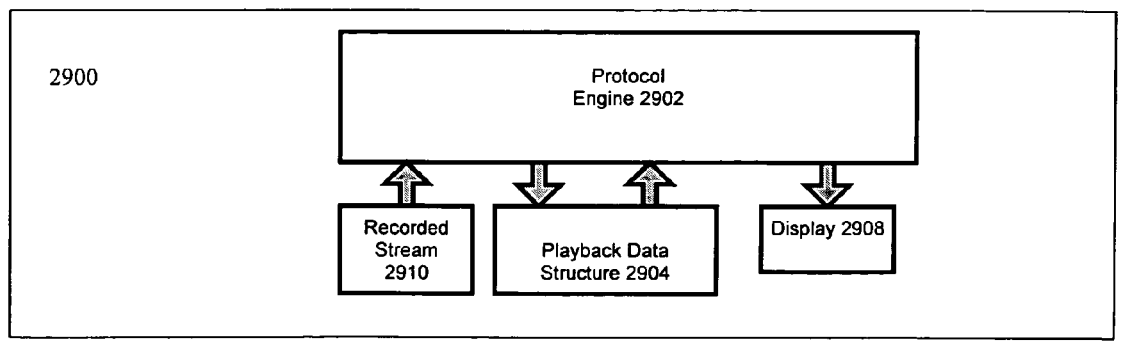
FIG. 29 is a block diagram depicting one embodiment of a system for automatic time-warped playback in rendering a recorded computer session.

Referring now to FIG. 29, a block diagram depicts one embodiment of a system for automatic time-warped playback in rendering a recorded computer session, including a protocol engine 2902, a recorded stream 2910, a playback data structure 2904, and a display 2908. In brief overview, the protocol engine 2902 generates a playback data structure 2904 in response to receiving a recorded stream 2910, said recorded stream 2910 comprising a plurality of packets, and said protocol engine 2902 rendering at least one packet in the recorded stream responsive to the generated playback data structure 2904.

In one embodiment, the protocol engine 2902 comprises a background protocol engine and a foreground protocol engine. In this embodiment, the background protocol engine receives the recorded stream 2910 and generates the playback data structure 2904. In this embodiment, the foreground protocol engine receives the recorded stream 2910 and renders at least one packet in the recorded stream responsive to the generated playback data structure 2904. In one embodiment, the background protocol engine and the foreground protocol engine reside on the same device. In another embodiment, the background protocol engine resides on a first device and the foreground protocol engine resides on a second device.

In another embodiment, the system comprises a single protocol engine 2902 generating the playback data structure 2904 and rendering at least one packet in the recorded stream responsive to the generated playback data structure 2904.

In one embodiment, the protocol engine 2902 stores in the playback data structure at least one instruction for rendering the recorded session. In one embodiment, the instruction comprises a modification of an identified time interval for rendering the contents of a packet in the recorded session. In another embodiment, the protocol engine stores metadata in the playback data structure. In this embodiment, the metadata comprises higher order instructions for rendering the contents of the packet.

In one embodiment, the protocol engine renders the contents of at least one packet in the recorded session responsive to contents of a playback data structure. In one embodiment, the protocol engine renders the at least one packet in the recorded session in a perceptible manner and to a buffer. In another embodiment, the protocol engine renders the at least one packet in the recorded session to a buffer.

In some embodiments, the rendered contents of the packets provide a streamlined regeneration of the original display data. In other embodiments, the rendered contents of the packets provide a customized version of the display data. In one embodiment, the determination to render the contents of the packet in a perceptible manner is responsive to a policy or user request. These embodiments provide users with control over the rendering of the recorded session.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for generating playback instructions for playback of a recorded presentation layer protocol data stream transmitted from an application server (i) executing an application for a client and (ii) streaming the output display generated by the application to the client, the method comprising:
   (a) receiving, by a protocol engine executing on a computing device, a recorded presentation layer protocol data stream comprising a plurality of packets representing display data generated by an application program executing on an application server;
   (b) determining, by the protocol engine, to render the contents of a first packet having content identifying a window having input focus, the window associated with the application;
   (c) determining, by the protocol engine, not to render the contents of a second packet having content identifying the window lacks input focus; and
   (c) storing, by the protocol engine, the determination for the first packet and for the second packet of the recorded presentation layer protocol data stream in a playback data structure.

2. The method of claim 1, wherein step (b) further comprises determining to render the first packet responsive to an evaluation of a type of user input stored in the first packet.

3. The method of claim 1, wherein step (b) further comprises determining to render the first packet responsive to an evaluation of a type of graphics update stored by the first packet.

4. The method of claim 1, wherein step (b) further comprises determining to render the first packet responsive to an evaluation of a type of interaction sequence stored by the first packet.

5. A method for playback of a recorded presentation layer protocol data stream transmitted from an application server (i) executing an application for a client and (ii) streaming the output display generated by the application to the client, the method comprising:
   (a) receiving, by a background protocol engine executing on a computing device, a recorded presentation layer protocol data stream comprising a plurality of packets representing display data generated by an application program executing on an application server and a playback data structure, a first packet of the plurality of packets having content identifying a window having input focus, the window associated with the application and a second packet of the plurality of packets having content identifying the window lacks input focus;
   (b) and
   determining, by a foreground protocol engine responsive to the playback data structure, to render the first packet and not to render the second packet.

6. The method of claim 5, further comprising determining to render the first packet responsive to an evaluation of a type of user input stored in the first packet.

7. The method of claim 5, further comprising determining to render the first packet responsive to an evaluation of a type of graphics update stored by the first packet.

8. The method of claim 5, further comprising determining to render the first packet responsive to an evaluation of a type of interaction sequence stored by the first packet.

9. The method of claim 5, further comprising storing, by the background protocol engine, in the playback data structure, instructions to render the first packet.

10. The method of claim 5, further comprising rendering, by the foreground protocol engine, the contents of the first packet.

11. A system for rendering a recorded presentation layer protocol data stream transmitted from an application server (i) executing an application for a client and (ii) streaming the output display generated by the application to the client comprising:
   a playback data structure generated by a background protocol engine and storing metadata instructions for rendering a first packet having content identifying a window having input focus and metadata instructions for not rendering a second packet having content identifying the window lacks input focus;
   the background protocol engine executing on a computing device and generating the playback data structure in response to receiving the recorded presentation layer protocol data stream, wherein the recorded presentation layer protocol data stream represents display data generated by an application program executed on an application server; and
   a foreground protocol engine, receiving the recorded presentation layer protocol data stream and the playback data structure comprising the metadata instructions and rendering the first packet of the recorded presentation layer protocol stream of the application program.

12. The system of claim 11, wherein the background protocol engine generates the playback data structure substantially simultaneously with the foreground protocol engine rendering the recorded presentation layer protocol data stream.

13. The system of claim 11, wherein the foreground protocol engine executes on the computing device.

14. The system of claim 11, wherein the background protocol engine further comprises storing in the playback data structure at least one instruction for rendering the first packet in the recorded presentation layer protocol data stream.

15. The system of claim 11, wherein the background protocol engine further comprises storing in the playback data structure a record indicating a time to render the first packet in the recorded presentation layer protocol data stream.

16. The system of claim 11, wherein the foreground protocol engine renders the first packet in the recorded presentation layer protocol data stream both in a human-perceptible manner and to a buffer.

17. The system of claim 11, wherein the playback data structure contains an offset within a file of the start of the first packet in the recorded presentation layer protocol data stream to a buffer.

* * * * *